(12) United States Patent
Hoof et al.

(10) Patent No.: US 9,135,516 B2
(45) Date of Patent: Sep. 15, 2015

(54) USER BODY ANGLE, CURVATURE AND AVERAGE EXTREMITY POSITIONS EXTRACTION USING DEPTH IMAGES

(71) Applicant: Microsoft Corporation, Redmond, WA (US)

(72) Inventors: Jonathan Hoof, Kenmore, WA (US); Anis Ahmad, Kirkland, WA (US); Daniel Kennett, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 256 days.

(21) Appl. No.: 13/790,731

(22) Filed: Mar. 8, 2013

(65) Prior Publication Data

US 2014/0254867 A1    Sep. 11, 2014

(51) Int. Cl.
*G06K 9/00* (2006.01)
*G06K 9/46* (2006.01)
(Continued)

(52) U.S. Cl.
CPC .............. *G06K 9/4604* (2013.01); *A63F 13/06* (2013.01); *G06K 9/00342* (2013.01); *G06K 9/00369* (2013.01); *G06T 7/0046* (2013.01); *G06T 7/0057* (2013.01); *G06T 7/20* (2013.01); *G06T 7/60* (2013.01); *A63F 2300/1093* (2013.01);
(Continued)

(58) Field of Classification Search
CPC ..................... G06K 9/4604; A63F 2300/6045; A63F 13/06; A63F 2300/1093
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Shefali Goradia
(74) *Attorney, Agent, or Firm* — Bryan Webster; Kate Drakos; Micky Minhas

(57) ABSTRACT

Embodiments described herein use depth images to extract user behavior, wherein each depth image specifies that a plurality of pixels correspond to a user. In certain embodiments, information indicative of an angle and/or curvature of a user's body is extracted from a depth image. This can be accomplished by fitting a curve to a portion of a plurality of pixels (of the depth image) that correspond to the user, and determining the information indicative of the angle and/or curvature of the user's body based on the fitted curve. An application is then updated based on the information indicative of the angle and/or curvature of the user's body. In certain embodiments, one or more average extremity positions of a user, which can also be referred to as average positions of extremity blobs, are extracted from a depth image. An application is then updated based on the average positions of extremity blobs.

20 Claims, 18 Drawing Sheets

(51) Int. Cl.
*A63F 13/20* (2014.01)
*G06T 7/00* (2006.01)
*G06T 7/20* (2006.01)
*G06T 7/60* (2006.01)

(52) U.S. Cl.
CPC .......... A63F 2300/6045 (2013.01); G06T 2207/10016 (2013.01); G06T 2207/10021 (2013.01); G06T 2207/10024 (2013.01); G06T 2207/10028 (2013.01); G06T 2207/30196 (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,359,704 A | 10/1994 | Rossignac et al. |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 | 8/2007 | Luck et al. |
| 7,259,747 B2 | 8/2007 | Bell |
| 7,308,112 B2 | 12/2007 | Fujimura et al. |
| 7,315,301 B1 | 1/2008 | Sell |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |

(56) References Cited

U.S. PATENT DOCUMENTS

| | | | |
|---|---|---|---|
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,284,258 B1 | 10/2012 | Cetin et al. | |
| 8,340,432 B2 | 12/2012 | Mathe et al. | |
| 2003/0043270 A1 | 3/2003 | Rafey et al. | |
| 2005/0099414 A1* | 5/2005 | Kaye et al. | 345/419 |
| 2008/0026838 A1 | 1/2008 | Dunstan et al. | |
| 2009/0122058 A1 | 5/2009 | Tschesnok | |
| 2009/0265671 A1 | 10/2009 | Sachs et al. | |
| 2009/0298650 A1 | 12/2009 | Kutliroff | |
| 2010/0034457 A1* | 2/2010 | Berliner et al. | 382/154 |
| 2010/0303289 A1 | 12/2010 | Polzin et al. | |
| 2011/0052006 A1 | 3/2011 | Gurman et al. | |
| 2011/0080336 A1 | 4/2011 | Leyvand et al. | |
| 2011/0193939 A1 | 8/2011 | Vassigh et al. | |
| 2012/0056982 A1 | 3/2012 | Katz et al. | |
| 2012/0139918 A1 | 6/2012 | Michail et al. | |
| 2012/0159290 A1 | 6/2012 | Pulsipher et al. | |
| 2012/0195471 A1 | 8/2012 | Newcombe et al. | |
| 2012/0214594 A1 | 8/2012 | Kirovski et al. | |
| 2012/0242789 A1 | 9/2012 | Cheng et al. | |
| 2012/0307010 A1 | 12/2012 | Evertt et al. | |
| 2012/0308140 A1 | 12/2012 | Ambrus et al. | |
| 2012/0309532 A1 | 12/2012 | Ambrus et al. | |
| 2012/0326976 A1 | 12/2012 | Markovic et al. | |
| 2013/0305547 A1* | 11/2013 | Grove | 33/17 A |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2007/102537 A1 | 9/2007 |
| WO | 2012/046392 A1 | 4/2012 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", in Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

(56) References Cited

OTHER PUBLICATIONS

International Search Report & Written Opinion dated Oct. 6, 2014, in PCT Patent Application No. PCT/US2014/020835 filed Mar. 5, 2014.

Brunner, Simon, "Using Microsoft Kinect Sensor to Perform Commands on Virtual Objects", Published on: Oct. 2, 2012, Available at: https://diuf.unifr.ch/main/diva/sites/diuf.unifr.ch.main.diva/files/Thesis%20paper.pdf.

Brubaker, Marcus A., "Physical Models of Human Motion for Estimation and Scene Analysis", in PhD. Thesis Submitted in Conformity with the Requirements for the Degree of Doctor of Philosophy, Graduate Department of Computer Science, University of Toronto, Jan. 5, 2012, 169 pages.

Gonzalez, et al., "Estimation of the Center of Mass with Kinect and Wii Balance Board", in Proceedings of IEEE/RSJ International Conference on Intelligent Robot and Systems, Oct. 7, 2012, 6 pages.

Sinthanayothin, et al., "Skeleton Tracking using Kinect Sensor & Displaying in 3D Virtual Scene", in International Journal of Advancements in Computing Technology, vol. 4, Issue 11, Jun. 2012, 11 pages.

Camplani, et al., "Efficient Spatio-Temporal Hole Filling Strategy for Kinect Depth Maps", in Proceedings of Three-Dimensional Image Processing & Applications II, Feb. 9, 2012, 10 pages.

Gaidon, et al., "A Time Series Kernel for Action Recognition", in Proceedings of the British Machine Vision Conference, Sep. 2011, 11 pages.

Lien, et al., "Skeleton-Based Data Compression for Multi-Camera Tele-Immersion System", in Advances in Visual Computing, Third International Symposium, Nov. 26, 2007, 10 pages.

Ye, et al., "Accurate 3D Pose Estimation from a Single Depth Image", in IEEE International Conference on Computer Vision, Nov. 6, 2011, 8 pages.

Obdrzalek, et al., "Accuracy and Robustness of Kinect Pose Estimation in the Context of Coaching of Elderly Population", in Annual International Conference of the IEEE Engineering in Medicine and Biology Society, Aug. 28, 2012, 6 pages.

Manasrah, Ahmad Adli, "Human Motion Tracking for Assisting Balance Training and Control of a Humanoid Robot", in PhD. Thesis Submitted in Partial Fulfilment of the Requirements for the Degree of Master of Science in Mechanical Engineering, Department of Mechanical Engineering, University of South Florida, Jan. 1, 2012, 82 pages.

Strauss, Ben, "Kinect Can 'Sort of' Handle Players Lying Down", Published on: Jul. 14, 2010, Available at: http://www.industrygamers.com/news/kinect-can-sort-of-handle-players-lying-down/.

Brubaker, Marcus, "Physics-Based Priors for Human Pose Tracking", in a Thesis Submitted in Conformity with the Requirements for the Degree of Master of Science, Graduate Department of Computer Science, University of Toronto, Mar. 11, 2013, 89 pages.

Poulios, Nikolaos, "Sensor Based Physical Interaction for Embodied Playful Learning Games", in Master Thesis Project, Jul. 2012, 81 pages.

Yu, et al., "Automatic Human Body Tracking and Modeling from Monocular Video Sequences", in IEEE International Conference on Acoustics, Speech and Signal Processing, Apr. 15, 2007, 4 pages.

Isenberg, et al., "Stylizing Silhouettes at Interactive Rates: From Silhouette Edges to Silhouette Strokes", in Journal of Computer Graphics Forum, vol. 21, Issue 3, Sep. 2002, 10 pages.

"1 Kinect Depth Inpainting and Filtering", Retrieved on: Dec. 3, 2013, Available at: http://www.radfordparker.com/papers/kinectinpainting.pdf.

Raskar, et al., "Image Precision Silhouette Edges", in Proceedings of the Symposium on Interactive 3D Graphics, Apr. 26, 1999, 7 pages.

Catto, et al., "Iterative Dynamics with Temporal Coherence", Feb. 22, 2005, Menlo Park, California, 24 pages.

Solh et al., "Hierarchical Hole-Filling for Depth-based View Synthesis in FTV and 3D Video", Draft, IEEE Journal of Selected Topics in Signal Processing, Jun. 2012.

Amendment dated Dec. 29, 2014, in PCT Patent Application No. PCT/US2014/020835 filed Mar. 5, 2014.

Written Opinion dated Apr. 1, 2015, in PCT Patent Application No. PCT/US2014/020835 filed Mar. 5, 2014.

Amendment dated May 8, 2015, in PCT Patent Application No. PCT/US2014/020835 filed Mar. 5, 2014.

\* cited by examiner

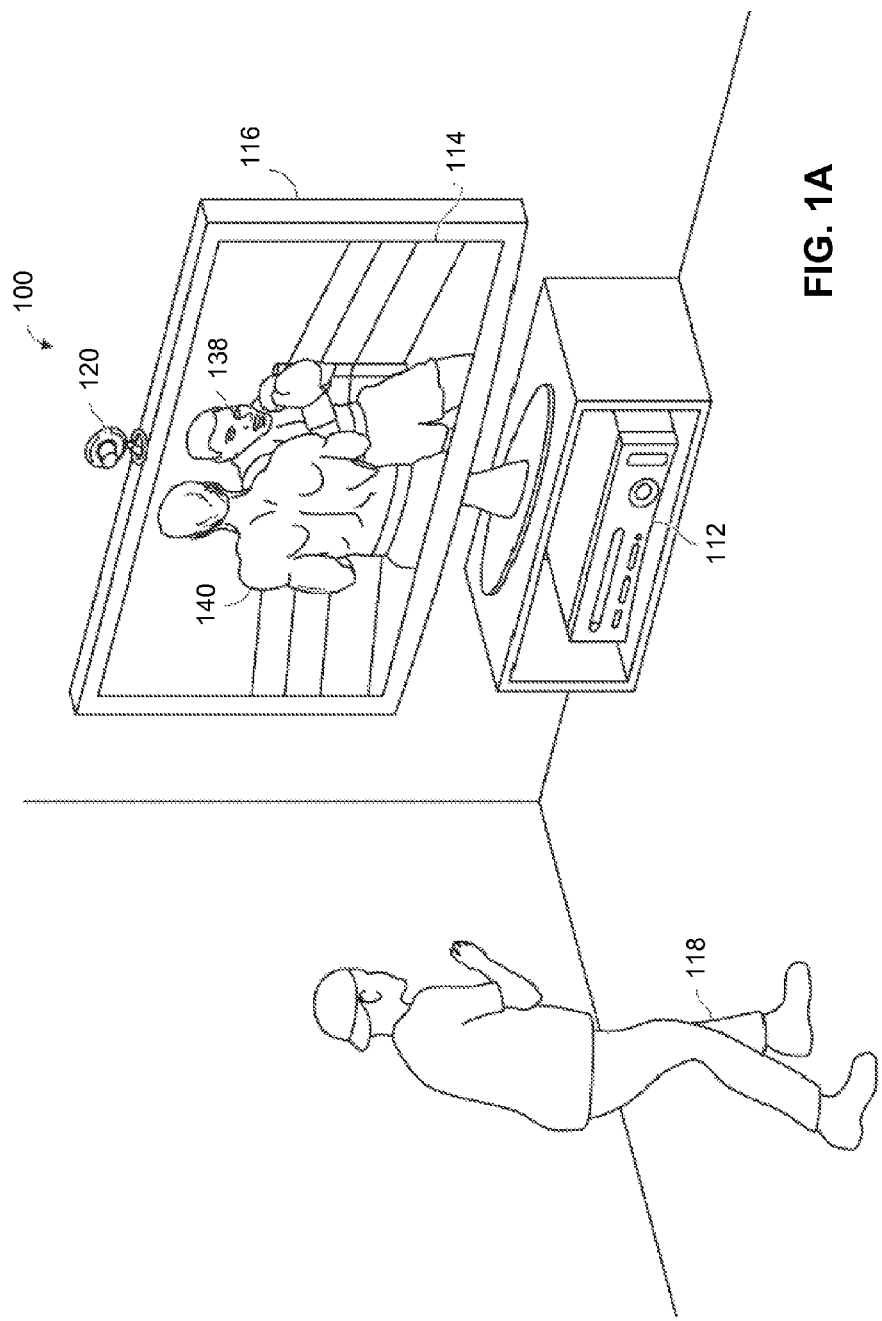

| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
|----|----|----|----|----|----|----|----|----|----|----|----|----|----|----|----|----|----|----|----|----|----|----|----|
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 18 | 20 | 20 | 20 | 20 | 20 | 20 | 20 | 20 | 20 | 30 | 30 |
| 30 | 15 | 15 | 15 | 16 | 16 | 16 | 18 | 18 | 18 | 18 | 18 | 9  | 20 | 20 | 19 | 19 | 20 | 20 | 20 | 20 | 20 | 30 | 30 |
| 30 | 15 | 15 | 15 | 16 | 16 | 16 | 18 | 8  | 8  | 9  | 9  | 9  | 9  | 9  | 9  | 9  | 19 | 19 | 20 | 20 | 20 | 30 | 30 |
| 30 | 15 | 15 | 15 | 16 | 16 | 16 | 8  | 8  | 7  | 8  | 8  | 8  | 8  | 8  | 8  | 9  | 9  | 9  | 19 | 20 | 20 | 30 | 30 |
| 30 | 15 | 15 | 16 | 16 | 16 | 8  | 7  | 7  | 6  | 7  | 7  | 7  | 7  | 7  | 8  | 8  | 9  | 9  | 9  | 20 | 20 | 30 | 30 |
| 30 | 15 | 15 | 16 | 16 | 8  | 8  | 6  | 6  | 5  | 5  | 5  | 6  | 7  | 7  | 7  | 8  | 8  | 9  | 19 | 20 | 20 | 30 | 30 |
| 30 | 15 | 15 | 16 | 7  | 7  | 7  | 6  | 5  | 5  | 5  | 5  | 5  | 7  | 6  | 7  | 8  | 8  | 9  | 19 | 20 | 20 | 30 | 30 |
| 30 | 15 | 15 | 16 | 7  | 7  | 7  | 5  | 5  | 5  | 5  | 5  | 5  | 5  | 6  | 7  | 8  | 8  | 9  | 9  | 19 | 30 | 30 | 30 |
| 30 | 15 | 15 | 16 | 7  | 7  | 6  | 5  | 5  | 5  | 5  | 5  | 5  | 5  | 6  | 7  | 8  | 8  | 9  | 9  | 19 | 30 | 30 | 30 |
| 30 | 15 | 15 | 7  | 7  | 6  | 6  | 5  | 5  | 5  | 5  | 5  | 5  | 5  | 6  | 7  | 8  | 8  | 9  | 19 | 19 | 30 | 30 | 30 |
| 30 | 15 | 15 | 6  | 6  | 5  | 6  | 5  | 5  | 5  | 4  | 4  | 5  | 4  | 4  | 6  | 7  | 8  | 8  | 9  | 19 | 20 | 30 | 30 |
| 30 | 15 | 15 | 5  | 6  | 5  | 3  | 5  | 5  | 5  | 5  | 5  | 5  | 5  | 5  | 5  | 6  | 7  | 8  | 9  | 19 | 20 | 30 | 30 |
| 30 | 15 | 15 | 4  | 5  | 4  | 4  | 5  | 5  | 5  | 5  | 5  | 5  | 5  | 5  | 5  | 6  | 7  | 8  | 9  | 19 | 19 | 30 | 30 |
| 30 | 15 | 15 | 5  | 5  | 5  | 5  | 5  | 5  | 5  | 5  | 5  | 5  | 5  | 5  | 5  | 6  | 7  | 8  | 18 | 18 | 19 | 30 | 30 |
| 30 | 15 | 15 | 15 | 5  | 4  | 5  | 5  | 5  | 5  | 5  | 5  | 5  | 5  | 5  | 6  | 7  | 8  | 18 | 18 | 18 | 30 | 30 | 30 |
| 30 | 15 | 15 | 15 | 5  | 5  | 5  | 5  | 5  | 5  | 5  | 5  | 5  | 5  | 5  | 6  | 7  | 8  | 18 | 18 | 18 | 30 | 30 | 30 |
| 30 | 15 | 15 | 15 | 15 | 5  | 5  | 5  | 5  | 5  | 5  | 5  | 5  | 5  | 6  | 7  | 8  | 18 | 18 | 18 | 30 | 30 | 30 | 30 |
| 30 | 15 | 15 | 15 | 15 | 15 | 5  | 5  | 5  | 5  | 5  | 5  | 5  | 5  | 6  | 6  | 7  | 8  | 18 | 18 | 18 | 30 | 30 | 30 |
| 30 | 15 | 15 | 15 | 15 | 15 | 5  | 5  | 5  | 5  | 5  | 5  | 5  | 5  | 6  | 7  | 8  | 18 | 18 | 18 | 18 | 30 | 30 | 30 |
| 30 | 15 | 15 | 15 | 15 | 15 | 5  | 5  | 5  | 5  | 5  | 5  | 5  | 6  | 7  | 7  | 18 | 18 | 18 | 18 | 18 | 30 | 30 | 30 |
| 30 | 15 | 15 | 15 | 15 | 15 | 5  | 5  | 5  | 5  | 5  | 5  | 6  | 6  | 7  | 7  | 18 | 18 | 18 | 18 | 30 | 30 | 30 | 30 |
| 30 | 15 | 15 | 15 | 15 | 15 | 5  | 5  | 5  | 5  | 5  | 5  | 6  | 6  | 7  | 7  | 18 | 18 | 18 | 18 | 30 | 30 | 30 | 30 |

FIG. 6

USER BODY ANGLE, CURVATURE AND AVERAGE EXTREMITY POSITIONS EXTRACTION USING DEPTH IMAGES

BACKGROUND

Many computing applications such as computer games, multimedia applications, or the like use controls to allow users to manipulate game characters or other aspects of an application. Conventionally, such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat. Recently, cameras have been used to allow users to manipulate game characters or other aspects of an application without the need for conventional handheld game controllers. More specifically, computing systems have been adapted to identify users captured by cameras, and to detect motion or other behaviors of the users. Typically, such computing systems have relied on skeletal tracking (ST) techniques to detect motion or other user behaviors. However, while useful for detecting certain types of user behaviors, ST techniques have proven to be unreliable for detecting other types of user behaviors. For example, ST techniques are typically unreliable for detecting user behaviors where the user is laying or sitting on or near the floor.

SUMMARY

Disclosed herein are systems and methods for extracting user behavior from depth images. Such systems and methods can be used in place of, or to supplement, skeletal tracking (ST) techniques that are often used to detect user behaviors such as user motion.

In accordance with an embodiment, each depth image, which is obtained using a capture device (e.g., a camera) located a distance from the user, specifies that a plurality of pixels of the depth image correspond to a user. Additionally, each depth image specifies, for each of the pixels corresponding to the user, a pixel location and a pixel depth, where the pixel depth is indicative of a distance between the capture device and a portion of the user represented by the pixel. Based on the depth images, information indicative of user behavior is extracted, and such information is used to update an application.

In certain embodiments, information indicative of an angle and/or curvature of a user's body is extracted from a depth image. This can be accomplished by fitting a curve to a portion of a plurality of pixels (of the depth image) that correspond to the user, and then determining the information indicative of the angle and/or curvature of the user's body based on the fitted curve. In certain embodiments, the fitted curve is produced by fitting a curve to a subset of pixels of the depth image that correspond to an upper peripheral portion, relative to a plane (e.g., a floor supporting the user), of the pixels corresponding to the user. Information indicative of an angle of the user's body can then be determined by determining an angle, relative to the plane, of a straight line extending between endpoints of the fitted curve.

The fitted curve can include a plurality of straight line segments, and in certain embodiments, includes exactly three straight line segments. In an embodiment, information indicative of a curvature of the user's body is determined by determining an angle of one of the straight line segments of the fitted curve relative to the straight line extending between endpoints of the fitted curve. Additionally, or alternatively, information indicative of a curvature of the user's body can be determined by determining a ratio of a first length to a second length, where the first length is the length of the straight line extending between endpoints of the fitted curve, and the second length is the length of a further straight line extending orthogonally from the straight line (extending between endpoints of the fitted curve) to a point of the fitted curve that is farthest away from the straight line (extending between endpoints of the fitted curve).

In certain embodiments, one or more average extremity positions of a user, which can also be referred to as average positions of extremity blobs, are extracted from a depth image. This can be accomplished by identifying a pixel of a depth image that corresponds to an extremity of the user, such as the leftmost, rightmost, topmost, bottommost, or frontmost extremity. Thereafter, there is an identification of pixels of the depth image that correspond to the user and are within a specified distance (e.g., within 5 pixels in a specified direction) of the pixel identified as corresponding to the extremity of the user. Such identified pixels can be referred to as an extremity blob, or simply as a blob. An average extremity position is then identified by determining an average position of the pixels of the blob. In other words, the average extremity position, also referred to as the average position of extremity blob, is determined by determining an average position of the pixels identified as corresponding to the user and being within the specified distance of the pixel corresponding to the extremity of the user. For a single depth image, there can be the identification of the average position of a right extremity blob, the average position of a left extremity blob, the average position of a top extremity blob, the average position of a bottom extremity blob, and/or the average position of a front extremity blob. The average positions of the right and left extremity blobs can more generally be referred to as the average positions of side blobs. In an embodiment, the pixels that correspond to a user are divided into quadrants, and one or more average positions of blobs are determined for one or more of the quadrants.

In certain embodiments, the information indicative of an angle and/or curvature of a user's body, which is determined from a depth image, is used to update an application. Additionally, or alternatively, the identified average positions of extremity blobs can also be used to update an application. For example, such angle, curvature and/or positional information can be used to track a user performing certain exercises and/or poses so that an avatar of the user can be controlled, points can be awarded to the user and/or feedback can be provided to the user. For a more specific example, where the application is a game that instructs a user to perform certain exercises and/or poses, the application can determine whether a user has performed an exercise or pose with correct form, and where they have not, can provide feedback to the user regarding how the user can improve their form. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B illustrate an example embodiment of a tracking system with a user playing a game.

FIG. 6 depicts exemplary data in an exemplary depth image.

DETAILED DESCRIPTION

Embodiments described herein use depth images to extract user behavior, wherein each depth image specifies that a plurality of pixels correspond to a user. In certain embodiments, information indicative of an angle and/or curvature of a user's body is extracted from a depth image. This can be accomplished by fitting a curve to a portion of a plurality of pixels (of the depth image) that correspond to the user, and determining the information indicative of the angle and/or curvature of the user's body based on the fitted curve. An application is then updated based on the information indicative of the angle and/or curvature of the user's body. In certain embodiments, one or more average extremity positions of a user, which can also be referred to as average positions of extremity blobs, are extracted from a depth image. An application is then updated based on the average positions of extremity blobs.

Figure 1B:
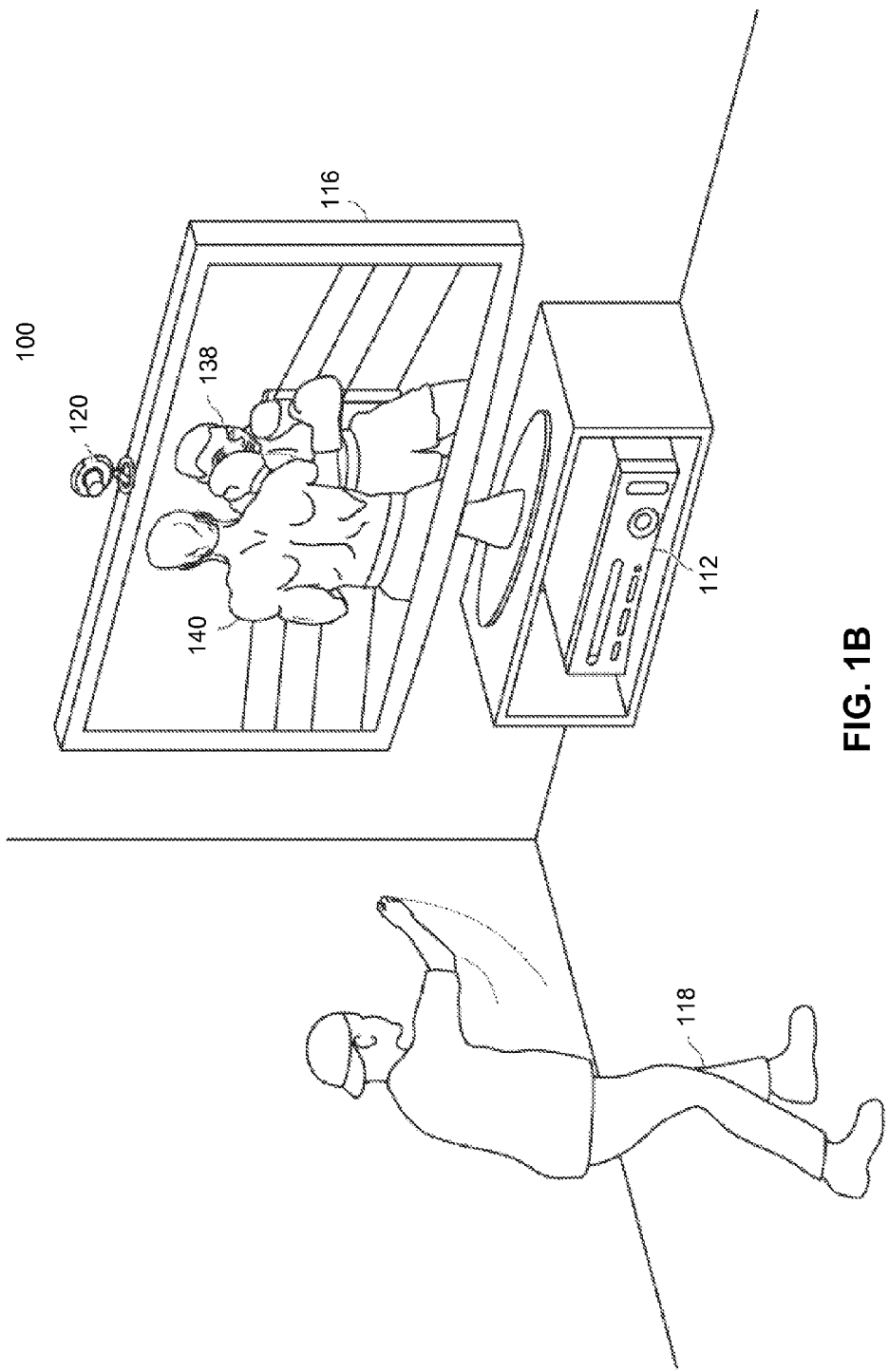

FIGS. 1A and 1B illustrate an example embodiment of a tracking system 100 with a user 118 playing a boxing video game. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked position, motion and/or other user behavior can be used to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user.

The computing system 112 may be a computer, a gaming system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage device for performing the processes described herein.

The capture device 120 may be, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one embodiment, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 16 may be connected to the computing system 112 via, for example, an S-Video cable, a coaxial cable, an HDMI cable, a DVI cable, a VGA cable, component video cable, or the like.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example embodiment, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 140. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 118 may be available, used, and analyzed in any suitable manner to interact with an application.

In example embodiments, the human target such as the user 118 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self propelled objects. In addition to boxing, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2A:
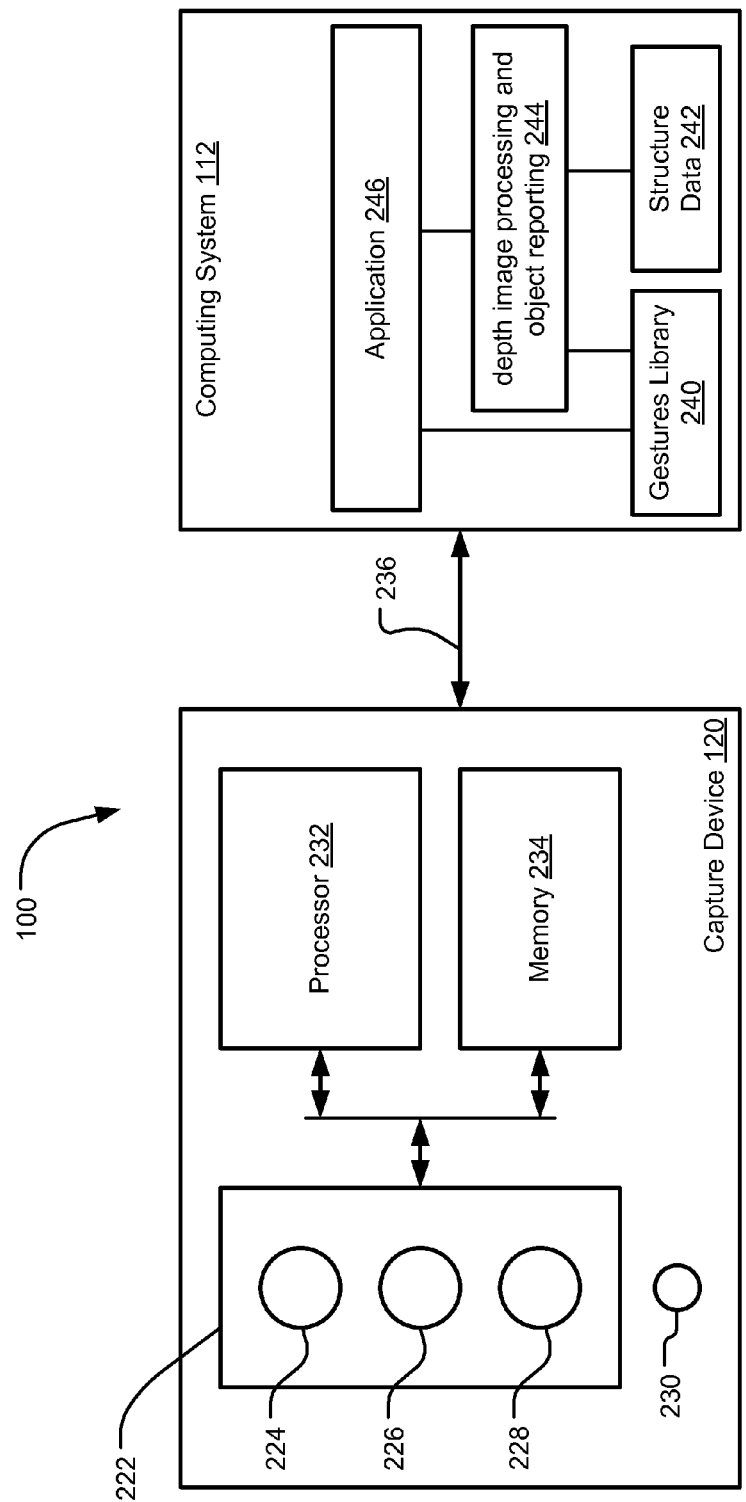
FIG. 2A illustrates an example embodiment of a capture device that may be used as part of the tracking system.

FIG. 2A illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2A, the capture device 120 may include an image camera component 222. According to an example embodiment, the image camera component 222 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2A, according to an example embodiment, the image camera component 222 may include an infrared (IR) light component 224, a three-dimensional (3-D) camera 226, and an RGB camera 228 that may be used to capture the depth image of a scene. For example, in time-of-flight analysis, the IR light component 224 of the capture device 120 may emit an infrared light onto the scene and may then use sensors (not shown) to detect the backscattered light from the surface of one or more targets and objects in the scene using, for example, the 3-D camera 226 and/or the RGB camera 228. In some embodiments, pulsed infrared light may be used such that the time between an outgoing light pulse and a corresponding incoming light pulse may be measured and used to determine a physical distance from the capture device 120 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 120 to a particular location on the targets or objects by analyzing the intensity of the reflected beam of light over time via various techniques including, for example, shuttered light pulse imaging.

In another example embodiment, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 28 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 130. The microphone 130 may include a transducer or sensor that may receive and convert sound into an electrical signal. According to one embodiment, the microphone 130 may be used to reduce feedback between the capture device 120 and the computing system 112 in the target recognition, analysis, and tracking system 100. Additionally, the microphone 30 may be used to receive audio signals that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2A, in one embodiment, the memory component 234 may be a separate component in communication with the image capture component 222 and the processor 232. According to another embodiment, the memory component 234 may be integrated into the processor 232 and/or the image capture component 222.

As shown in FIG. 2A, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track positions and/or motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one embodiment, depth image processing and object reporting module 244 will report to application 246 an identification of each object detected and the location of the object for each frame. Application 246 will use that information to update the position or movement of an avatar or other images in the display.

Figure 2B:
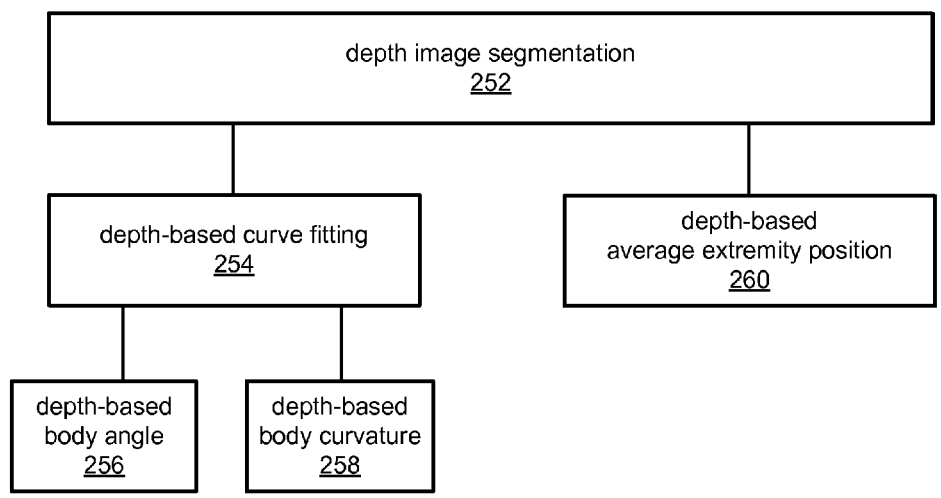
FIG. 2B illustrates an example embodiment of the depth image processing and object reporting module introduced in FIG. 2A.

FIG. 2B illustrates an example embodiment of the depth image processing and object reporting module 244 introduced in FIG. 2A. Referring to FIG. 2B, the depth image processing and object reporting module 244 is shown as including a depth image segmentation module 252, a depth-based curve fitting module 254, a depth-based body angle module 256, a depth-based body curvature module 258, and a depth-based average extremity position module 260. In an embodiment, the depth image segmentation module 252 is configured to detect one or more users (e.g., human targets) within a depth image, and associates a segmentation value with each pixel. Such segmentation values are used to indicate which pixels correspond to a user. For example, a segmentation value of 1 can be assigned to all pixels that correspond to a first user, a segmentation value of 2 can be assigned to all pixels that correspond to a second user, and an arbitrary predetermined value (e.g., 255) can be assigned to the pixels that do not correspond to a user. It is also possible that segmentation values can be assigned to objects, other than users, that are identified within a depth image, such as, but not limited to, a tennis racket, a jump rope, a ball, a floor, or the like. In an embodiment, as a result of a segmentation process performed by the depth image segmentation module 252, each pixel in a depth image will have four values associated with the pixel, including: an x-position value (i.e., a horizontal value); a y-position value (i.e., a vertical value); a z-position value (i.e., a depth value); and a segmentation value, which was just explained above. In other words, after segmentation, a depth image can specify that a plurality of pixels correspond to a user, wherein such pixels can also be referred to as a depth-based silhouette or a depth image silhouette of a user. Additionally, the depth image can specify, for each of the pixels corresponding to the user, a pixel location and a pixel depth. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel.

Still referring to FIG. 2B, in an embodiment, the depth-based curve fitting module 254 is used to fit a curve to a portion of the plurality of pixels corresponding to a user. The depth-based body angle module 256 is used to determine information indicative of an angle of a user's body, and the depth-based body curvature module 258 is used to determine information indicative of a curvature of a user's body. Additional details relating to determining information indicative of an angle of a user's body, and determining information indicative of a curvature of a user's body, are described below with reference to FIGS. 7-10. The depth-based average extremity position module 260 is used to determine information indicative of extremities of a user's body, additional details of which are described below with reference to FIGS. 11A-17. The depth image processing and object report modules 244 can also include additional modules which are not described herein.

Figure 3:
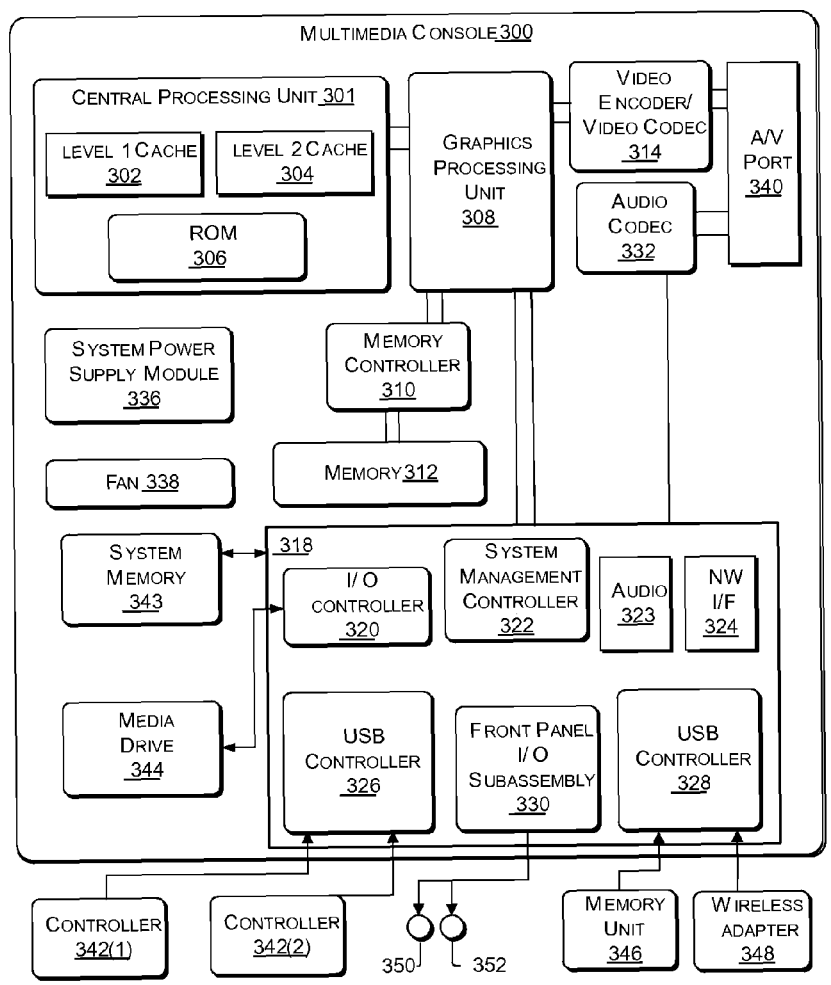
FIG. 3 illustrates an example embodiment of a computing system that may be used to track user behavior and update an application based on the user behavior.

FIG. 3 illustrates an example embodiment of a computing system that may be the computing system 112 shown in FIGS. 1A-2B used to track motion and/or animate (or otherwise update) an avatar or other on-screen object displayed by an application. The computing system such as the computing system 112 described above with respect to FIGS. 1A-2 may be a multimedia console, such as a gaming console. As shown in FIG. 3, the multimedia console 300 has a central processing unit (CPU) 301 having a level 1 cache 102, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec 314 form a video processing pipeline for high speed and high resolution graphics processing. Data is carried from the GPU 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
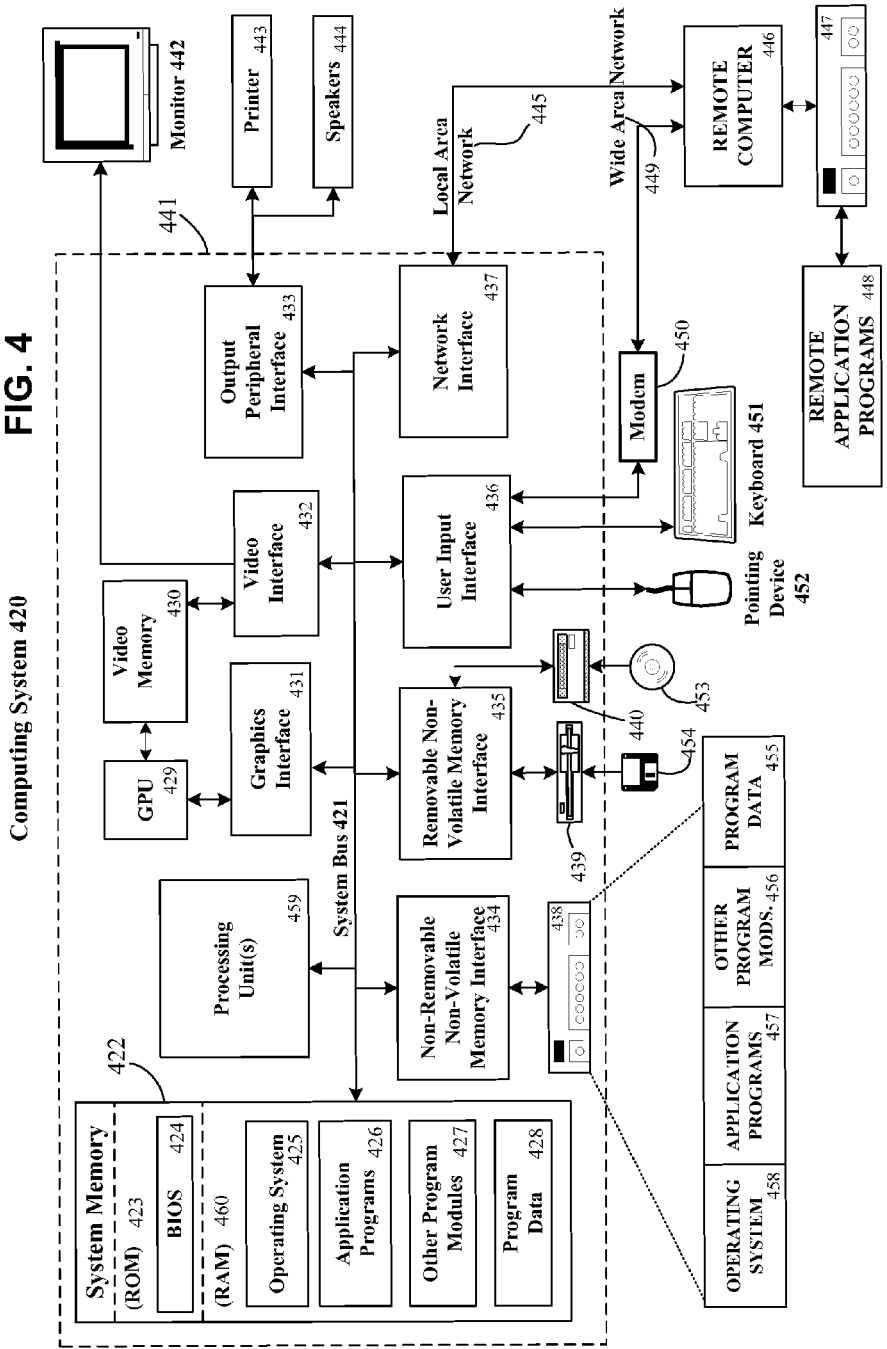
FIG. 4 illustrates another example embodiment of a computing system that may be used to track user behavior and update an application based on the tracked user behavior.

FIG. 4 illustrates another example embodiment of a computing system 420 that may be the computing system 112 shown in FIGS. 1A-2B used to track motion and/or animate (or otherwise update) an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433. Capture Device 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

As mentioned above, skeletal tracking (ST) techniques are often used to detect motion of a user or other user behaviors. However, while useful for detecting certain types of user behaviors, ST techniques have proven to be unreliable for detecting other types of user behavior. For example, ST techniques are typically unreliable for detecting user behaviors where the user is laying or sitting on or near the floor. Certain embodiments described herein rely on depth images to detect user behaviors. Such user behaviors detected based on depth base images can be used in place of, or to supplement, ST techniques for detecting user behaviors. Accordingly, before discussing such embodiments in additional detail, it would first be useful to provide additional details of depth images.

Figure 5:
FIG. 5 illustrates an exemplary depth image.

FIG. 5 illustrates an example embodiment of a depth image that may be received at computing system 112 from capture device 120. According to an example embodiment, the depth image may be an image and/or frame of a scene captured by, for example, the 3-D camera 226 and/or the RGB camera 228 of the capture device 120 described above with respect to FIG. 2A. As shown in FIG. 5, the depth image may include a human target corresponding to, for example, a user such as the user 118 described above with respect to FIGS. 1A and 1B and one or more non-human targets such as a wall, a table, a monitor, or the like in the captured scene. As described above, the depth image may include a plurality of observed pixels where each observed pixel has an observed depth value associated therewith. For example, the depth image may include a two-dimensional (2-D) pixel area of the captured scene where each pixel at particular x-value and y-value in the 2-D pixel area may have a depth value such as a length or distance in, for example, centimeters, millimeters, or the like of a target or object in the captured scene from the capture device. In other words, as explained above in the discussion of FIG. 2B, a depth image can specify, for each of the pixels in the depth image, a pixel location and a pixel depth. Following a segmentation process, e.g., performed by the by the depth image processing and object reporting module 244, each pixel in the depth image can also have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. The segmentation value is used to indicate whether a pixel corresponds to a specific user, or does not correspond to a user.

In one embodiment, the depth image may be colorized or grayscale such that different colors or shades of the pixels of the depth image correspond to and/or visually depict different distances of the targets from the capture device 120. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

FIG. 6 provides another view/representation of a depth image (not corresponding to the same example as FIG. 5). The view of FIG. 6 shows the depth data (i.e., z-position values) for each pixel as an integer that represents the distance of the target to capture device 120 for that pixel. The example depth image of FIG. 6 shows 24×24 pixels; however, it is likely that a depth image of greater resolution would be used. Each of the pixels in FIG. 6 that is represented by a z-position value can also include an x-position value, a y-position value, and a segmentation value. For example, the pixel in the left uppermost corner can have an x-position value=1, and a y-position value=1; and the pixel in the left lowermost corner can have an x-position value=1, and a y-position value=24. Segmentation values, as mentioned above, are used to indicate which pixels correspond to a user.

Depending upon what user behavior is being tracked, it would sometimes be useful to be able to determine information indicative of an angle of a user's body and/or information indicative of a curvature of a user's body. For example, such information can be used to analyze a user's form when performing certain exercises, so that an avatar of the user can be controlled, points can be awarded to the user and/or feedback can be provided to the user. The term exercise, as used herein, can refer to calisthenics exercises, such as push-ups, as well as types of exercises that often involve poses, such as yoga and palates, but is not limited thereto. For example, in certain exercises, such as push-ups and various plank exercises (e.g., a traditional plank, also known as an elbow plank, a side plank, a side plank leg lift, and an up-down plank), a user's body or a portion thereof (e.g., the user's back) is supposed to be straight. In other exercises, such a downward dog yoga exercise, an upward facing dog yoga exercise, a user's body or a portion thereof is supposed to be curved in a specific manner. Skeletal tracking (ST) techniques are typically unreliable for tracking a user performing such types of exercises, especially where the exercises involve the user laying or sitting on or near the floor. Certain embodiments described below, rely on depth images to determine information indicative of an angle of a user's body and/or information indicative of a curvature of a user's body. Such embodiments can be used in place of, or to supplement, skeletal tracking (ST) techniques that are often used to detect user behaviors based on RGB images.

Figure 7:
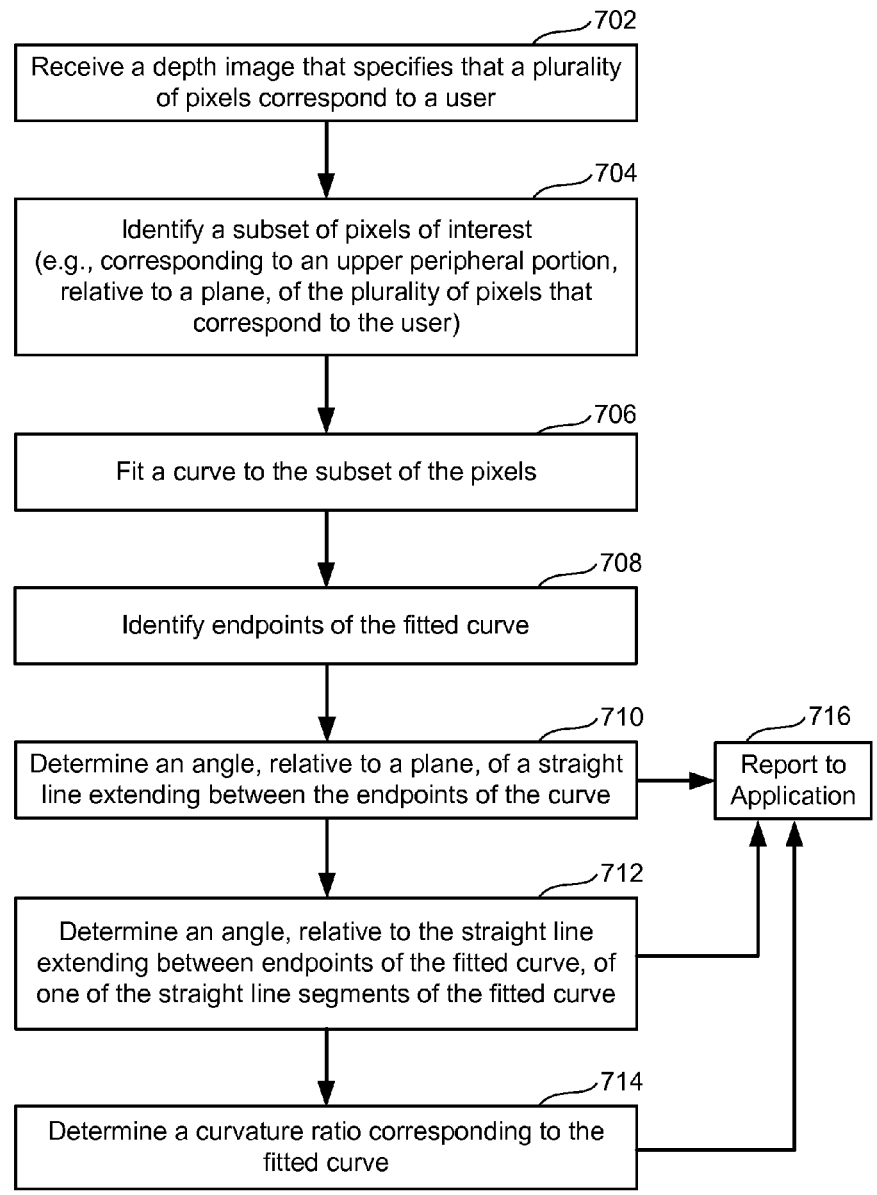
FIG. 7 illustrate a high level flow diagram that is used to summarize methods for determining information indicative of an angle and/or curvature of a user's body based on a depth image.

The high level flow diagram of FIG. 7 will now be used to summarize a method for determining information indicative of an angle of a user's body and/or information indicative of a curvature of the user's body based on a depth image. At step 702, a depth image is received, wherein the depth image specifies that a plurality of pixels correspond to a user. The depth image can be obtained using a capture device (e.g., 120) located a distance from the user (e.g., 118). More generally, a depth image and a color image can be captured by any of the sensors in capture device 120 described herein, or other suitable sensors known in the art. In one embodiment, the depth image is captured separately from the color image. In some implementations, the depth image and color image are captured at the same time, while in other implementations they are captured sequentially or at different times. In other embodiments, the depth image is captured with the color image or combined with the color image as one image file so that each pixel has an R value, a G value, a B value and a Z value (distance). Such a depth image and a color image can be transmitted to the computing system 112. In one embodiment, the depth image and color image are transmitted at 30 frames per second. In some examples, the depth image is transmitted separately from the color image. In other embodiments, the depth image and color image can be transmitted together. Since the embodiments described herein primarily (or solely) rely on use of depth images, the remaining discussion primarily focuses on use of depth images, and thus, does not discuss the color images.

The depth image received at step 702 can also specify, for each of the pixels corresponding to the user, a pixel location and a pixel depth. As mentioned above, in the discussion of FIG. 2B, a pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. For the purpose of this description it is assumed that the depth image received at step 702 has already been subject to a segmentation process that determined which pixels correspond to a user, and which pixels do not correspond to a user. Alternatively, if the depth image received at step 702 has not yet been through a segmentation process, the segmentation process can occur between steps 702 and 704.

At step 704, a subset of pixels that are of interest are identified, wherein a curve will be fit to the identified subset at step 706 discussed below. As mentioned above, the plurality of pixels of a depth image that correspond to a user can also be referred to as a depth image silhouette of a user, or simply a depth image silhouette. Accordingly, at step 704, a portion of interest of the depth image silhouette is identified, wherein a curve will be fit to the identified portion at step 706. In one embodiment, pixels of interest (i.e., the portion of interest of the depth image silhouette) are the pixels that correspond to the torso of the user. In another embodiment, pixels of interest are the pixels that correspond to the legs, torso and head of the user. In a further embodiment, the pixels of interest are the pixels that correspond to an upper peripheral portion, relative to a plane (e.g., the floor supporting the user), of the plurality of pixels corresponding to the user. In still another embodiment, the pixels of interest are the pixels that correspond to a lower peripheral portion, relative to a plane (e.g., the floor supporting the user), of the plurality of pixels corresponding to the user.

At step 706, a curve is fit to the subset of pixels identified at step 704, to thereby produce a fitted curve. In certain embodiments, the fitted curve produced at step 706 includes a plurality of straight line segments. In one embodiment, the fitted curve includes exactly three straight line segments (and thus, two endpoints, and two midpoints) that can be determined, e.g., using a third degree polynomial equation. An example of a fitted curve including exactly three straight line segments is shown in and discussed below with reference to FIGS. 8A-8C. It is also possible that the fitted curve has as few as two straight line segments. Alternatively, the fitted curve can have four or more straight line segments. In still another embodiment, the fitted curve can be a smooth curve, i.e., a curve that is not made up of straight line segments. A myriad of well-known curve fitting techniques can be used to perform step 706, and thus, additional detail of how to fit a curve to a group of pixels need not be described. At step 708, the endpoints of the fitted curve are identified.

For much of the remaining description, it will be assumed that the pixels of interest (i.e., the portion of interest of the depth image silhouette) identified at step 704 are the pixels that correspond to an upper peripheral portion, relative to a plane (e.g., the floor supporting the user), of the plurality of pixels corresponding to the user. A benefit of this embodiment is that determinations based on the identified pixels are not affected by loose hanging clothes of the user. It will also be assumed that the fitted curve produced at step 706 includes exactly three straight line segments. A benefit of this will be appreciated from the discussion below of step 714.

Figure 8A:
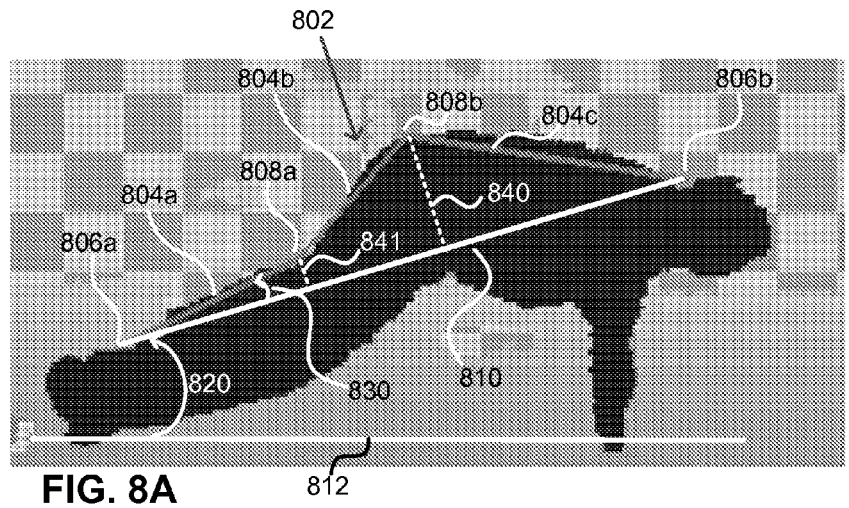
FIGS. 8A-8C, which show silhouettes representing a plurality of pixels corresponding to a user (of a depth image) performing different yoga poses or exercises, are used to explain how information indicative of an angle and/or curvature of a user's body can be determine based on a depth image.
Figure 8B:
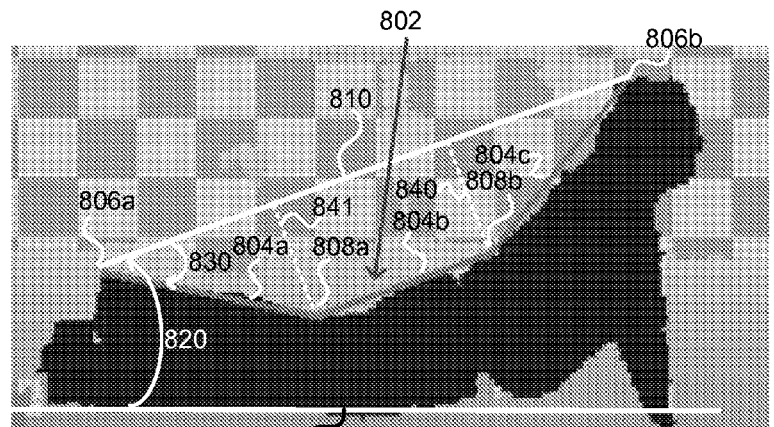
Figure 8C:
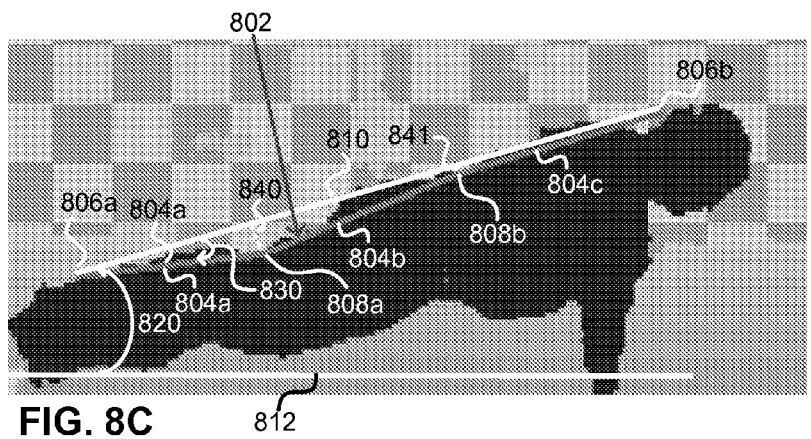

Before continuing with the description of the flow diagram in FIG. 7, reference will briefly be made to FIGS. 8A-8C. Referring to FIG. 8A, the dark silhouette shown therein represents a plurality of pixels (of a depth image) corresponding to a user performing a four-limbed staff yoga pose, which is also known as the Chaturanga Dandasana pose. Also shown in FIG. 8A is a curve 802 that is fit to the pixels that correspond to an upper peripheral portion, relative to a plane 812 (e.g., the floor supporting the user), of the plurality of pixels corresponding to the user. Explained another way, the curve 802 is fitted to the top of the depth image silhouette of the user. The fitted curve 802 includes three straight line segments 804a, 804b and 804c, which can collectively be referred to as straight line segments 804. The end points of the fitted curve are labeled 806a and 806b, and can be collectively referred to as end points 806. Mid points of the fitted curve are labeled 808a and 808b, and can be collectively referred to as mid points 808. A straight line extending between the two endpoints is labeled 810.

FIG. 8B, which is similar to FIG. 8A, corresponds to a point in time after the user has repositioned themselves into another yoga pose. More specifically, in FIG. 8B, the dark silhouette shown therein represent a plurality of pixels (of a depth image) corresponding to the user performing an upward-facing dog yoga pose, which is also known as the Urdhva Mukha Svanasana pose. For consistency, the fitted curve 802, the straight line segments 804, the end points 806, the midpoints 808, and the straight line 810 between the end points 806 are labeled in the same manner in FIG. 8B as they were in FIG. 8A.

In FIG. 8C, the dark silhouette shown therein represent a plurality of pixels (of a depth image) corresponding to the user either performing a plank position yoga pose, or performing a push-up exercise. Again, the fitted curve 802, the straight line segments 804, the end points 806, the midpoints 808, and the straight line 810 between the end points 806 are labeled in the same manner in FIG. 8C as they were in FIGS. 8A and 8B.

Referring again to the flow diagram of FIG. 7, at steps 710-714 information indicative of an angle of the user's body and information indicative of a curvature of the user's body are determined Such information is reported to an application, as indicated at step 716, which enables the application to be updated based on the reported information. Additional details of steps 710-714 are provided below. When discussing these steps, frequent references to FIGS. 8A-8C are made, to provide examples of the steps being discussed.

At step 710, there is a determination of an angle of a straight line between the endpoints of the fitted curve, relative to a plane (e.g., the floor supporting the user). In FIG. 8A, the angle 820 is an example of such an angle. More specifically, the angle 820 is the angle, relative to the plane 812, of the straight line 810 between the endpoints 806 of the fitted curve 802. Further examples of the angle 820 are shown in FIGS. 8B and 8C. The angle 820, which is indicative of an overall angle of the user's body relative to a plane (e.g., the floor) can be used by an application to determine a likely position or pose of the user, to update an avatar that is being displayed based on the position or pose of the user, and/or to provide feedback to the user regarding whether the user is in a proper position or pose, but is not limited thereto. For more specific examples, such information can provide useful information to an application where a user has been instructed to hold a pose where their back and legs are supposed to be as straight as possible, or are supposed to have a specific curvature.

The angle 820 in FIG. 8A is similar to the angle 820 in FIG. 8B, even though the user represented by the pixels is in quite different poses. This occurs because the user's head and feet are in relatively similar positions, even though the position and curvature of the trunk of the user's body has significantly changed. This provides some insight into why it would also be useful obtain information indicative of the curvature of the user's body, as is done at steps 712 and 714, discussed below.

At step 712, there is a determination of an angle of a straight line between the endpoints of the fitted curve, relative to one of the straight line segments of the fitted curve. In FIG. 8A, the angle 830 is an example of such an angle. More specifically, the angle 830 is the angle, relative to the straight line segment 804a (of the fitted curve 802), of the straight line 810 between the endpoints 806 of the fitted curve 802. Further examples of the angle 830 are shown in FIGS. 8B and 8C. The angle 830 in FIG. 8A is a positive angle. By contrast, the angle 830 in FIG. 8B is a negative angle. Thus, it can be understood how the angle 830 can be used by an application to distinguish between the different poses of the user. More generally, it can be understood from the above discussion how the angle 830 is indicative of the curvature of the user's body. In the above example, the angle 830 is the angle between the straight line 810 (between the endpoints 806 of the fitted curve 802) and the straight line segment 804a (of the fitted curve 802). Alternatively, or additionally, the angle between the straight line 810 (between the endpoints 806 of the fitted curve 802) and another straight line segment 804 (of the fitted curve 802), such as the straight line segment 804c, can be determined.

At step 714, there is a determination of a curvature ratio corresponding to the fitted curve. In accordance with an embodiment, the curvature ratio is the ratio of the length of a first straight line extending between endpoints of the fitted curve, and the length of a second line extending orthogonally from the first straight line to a point of the fitted curve that is farthest away from (i.e., deviates furthest from) the first straight line. For example, referring to FIG. 8A, the curvature ratio is the ratio of the length of the straight line 810 extending between the endpoints 806 of the fitted curve 802, and the length of the line 840 extending orthogonally from the straight line 810 to the point of the fitted curve 802 that is farthest away from the straight line 810. A benefit of implementing the embodiment where the fitted curve (e.g., 802) includes exactly three straight line segments is that the length of the second line is very easily and quickly determined, as will be described in additional detail with reference to FIG. 9.

Figure 9:
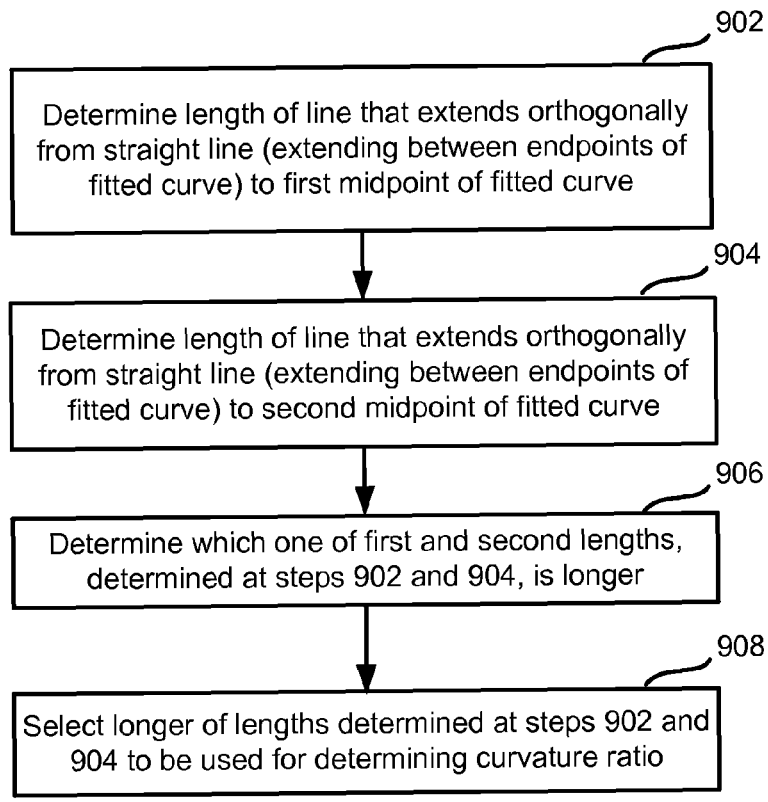
FIG. 9 is a high level flow diagram that is used to provide additional details of one of the steps in FIG. 7, according to an embodiment.

The high level flow diagram of FIG. 9 will now be used to describe a method for determining the curvature ratio where the straight line segments of the fitted curve include exactly straight line segments. Referring to FIG. 9, at step 902 there is a determination of a length of a line that extends orthogonally from the straight line (extending between endpoints of the fitted curve) to a first midpoint of the fitted curve. At step 904, there is a determination of a length of a line that extends orthogonally from the straight line (extending between endpoints of the fitted curve) to a second midpoint of the fitted curve. Referring briefly back to FIG. 8A, step 902 can be performed by determining the length of the line 841 that extends orthogonally from the straight line 819 to the midpoint 808a of the fitted curve 802. Similarly, step 904 can be performed by determining the length of the line 840 that extends orthogonally from the straight line 819 to the other midpoint 808b of the fitted curve 802. Returning to the flow diagram of FIG. 9, at step 906, there is a determination of which one of the lengths, determined at steps 902 and 904, is longer. As indicated at step 908, the longer of the lengths is selected to be used, when determining the curvature ratio corresponding to the fitted curve at step 714, as the length of the line extending orthogonally from the straight line (extending between endpoints of the fitted curve) to a point of the fitted curve that is farthest away from (i.e., deviates furthest from) the straight line (extending between endpoints of the fitted curve). For example, referring back to FIG. 8A, using the results of the method described with reference to FIG. 9, the curvature ratio can then be determined by determining the ratio of the length of the straight line 840 to the length of the straight line 810 that extends between the endpoints 806a and 806b of the fitted curve 802.

Referring back to FIG. 2A, the depth image processing and object reporting module 244 can report its determination to the application 246. Such reporting was also discussed above with reference to step 716 in FIG. 7. More specifically, as shown in FIG. 7, information indicative of the angle determined at step 710, the angle determined at step 712 and/or the curvature ratio determined at step 714 can be reported to the application.

Figure 10:
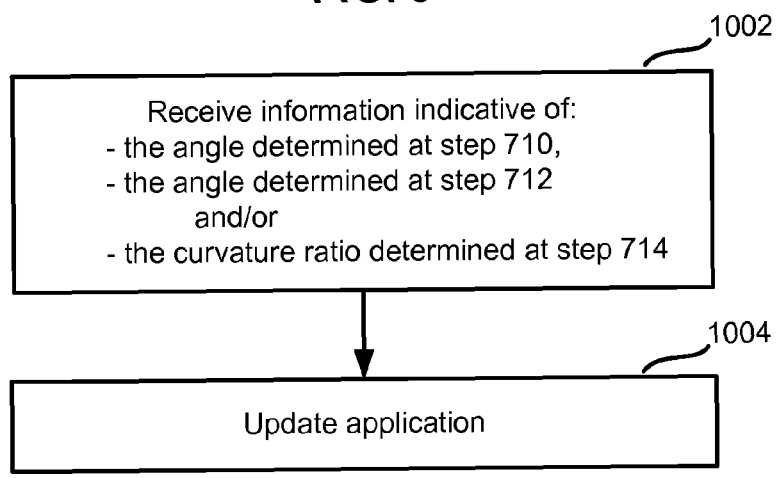
FIG. 10 illustrates a high level flow diagram that is used to summarize how an application can be updated based on information determined in accordance with embodiments described with reference to FIGS. 7-9.

Referring now to FIG. 10, at step 1002 the application receives information indicative of the angle determined at step 710, the angle determined at step 712 and/or the curvature ratio determined at step 714. As shown at step 1004, the application is updated based on such information. For example, as mentioned above, such information can be used to track a user performing certain exercises and/or poses so that an avatar of the user can be controlled, points can be awarded to the user and/or feedback can be provided to the user. For a more specific example, where the application 246 is a game that instructs a user to perform certain exercises and/or poses, the application 246 can determine whether a user has performed an exercise or pose with correct form, and where they have not, can provide feedback to the user regarding how the user can improve their form.

Where more than one user is represented in a depth image, a separate instance of the method of FIG. 7 can be performed for each user. For example, assume that a first group of pixels in a depth image correspond to a first user, and a second group of pixels in the same depth image correspond to a second user. This would result in first information indicative of an angle and/or curvature corresponding to the first user, and second information indicative of an angle and/or curvature corresponding to the second user.

The method described above with reference to FIG. 7 can be repeated for additional depth images, thereby resulting in information indicative of an angle and/or curvature of a user's body being determined for each of a plurality of depth images. This enables changes in an angle and/or curvature of the user's body to be tracked. Where more than one user is represented in a depth image, each time the method is repeated, separate information indicative of an angle and/or curvature of a user's body can be determined for each user represented in the depth image.

An advantage of determining information indicative of an angle and/or curvature of a user's body, based entirely on a depth image, is that information indicative of the angle and/or curvature of a user's body can be determined even when ST techniques fail. Another advantage is that information indicative of an angle and/or curvature of a user's body can be determined once a depth image is available in a processing pipeline, thereby reducing latency, as ST techniques do not need to be executed. Nevertheless, information indicative of the angle and/or curvature of a user's body can also be determined using ST techniques, if desired.

Depending upon what user behavior is being tracked, it would sometimes be useful to be able to determine information indicative of extremities of a user's body. ST techniques are often unreliable for detecting extremities of a user's body, especially where the user is laying or sitting on or near the floor (e.g., when the user is sitting with their feet extended forwards toward the capture device). Certain embodiments described below rely on depth images to determine information indicative of extremities of a user's body. Such embodiments can be used in place of, or to supplement, skeletal tracking (ST) techniques that are often used to detect user behaviors based on RGB images.

Figure 11A:
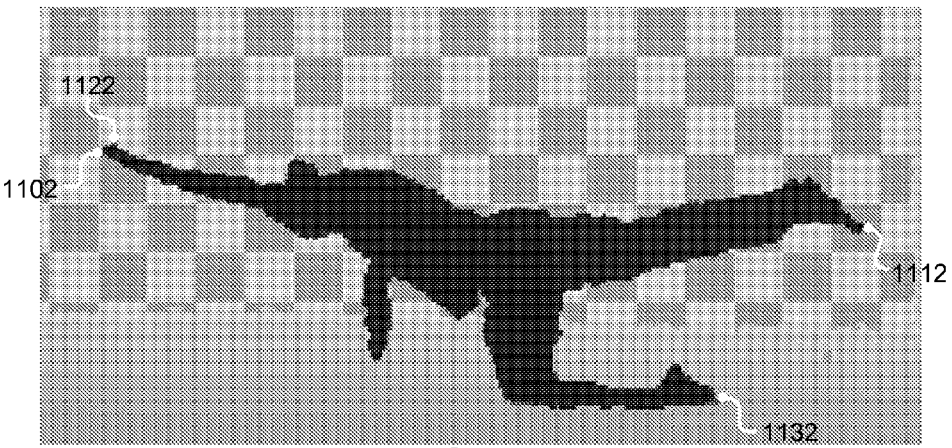
FIGS. 11A-11F, which show silhouettes representing a plurality of pixels corresponding to a user (of a depth image) performing a yoga pose or other exercise, are used to explain how extremities of a user can be identified, and average extremity positions (also referred to as average positions of extremity blobs) can be determined.

Referring to FIG. 11A, the dark silhouette shown therein represents a plurality of pixels (of a depth image) corresponding to a user in variation on a standard plank position, but with one arm and one leg extended in opposite directions. Also shown in FIG. 11A are points 1102, 1112, 1122 and 1132 that corresponds, respectively, to the leftmost, rightmost, topmost and bottommost pixels (of the depth image) corresponding to the user. While it would be possible to track one or more extremities of the user over multiple depth image frames based on the points 1102, 1112, 1122 and/or 1132, such points have been shown to significantly change from frame to frame, causing the points to be relatively noisy data points. For example, such noise can result from slight movements of the user's hands, feet, head and/or the like. Certain embodiments, which are described below, can be used to overcome this noise problem by tracking average positions of extremity blobs, where the term blob is being used herein to refer to a group of pixels of a depth image that correspond to a user and are within a specified distance of a pixel identified as corresponding to an extremity of the user.

Figure 11B:
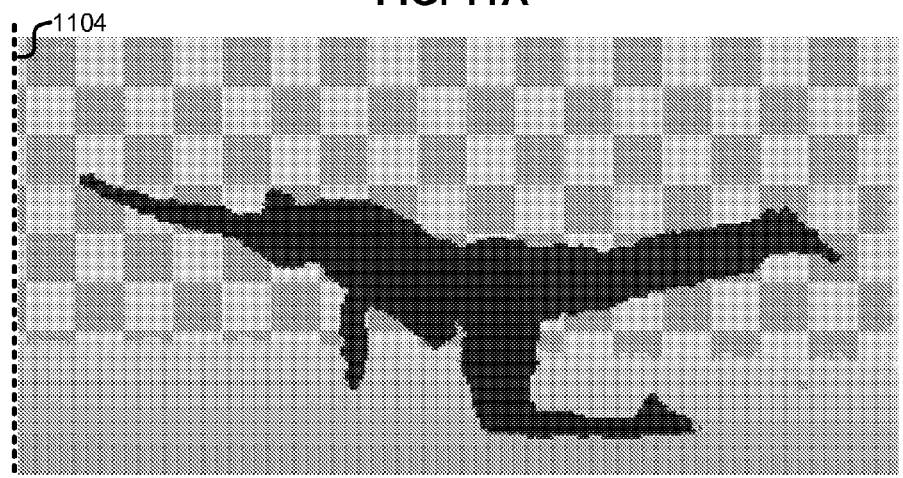
Figure 11C:
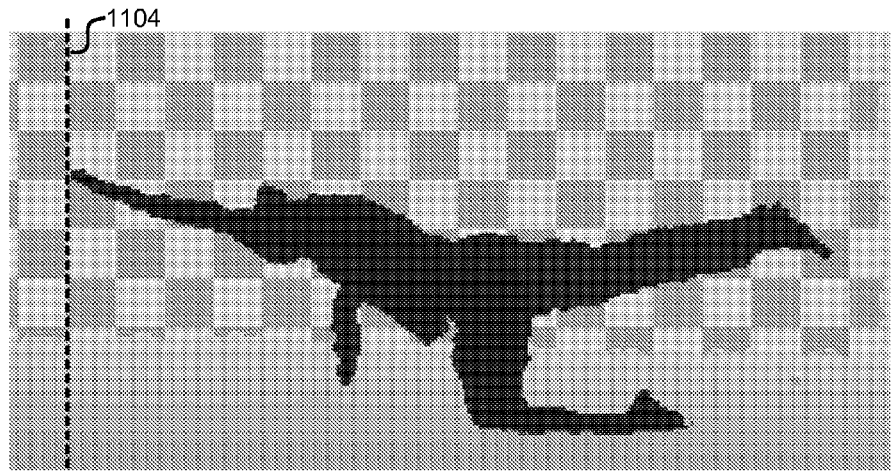
Figure 11D:
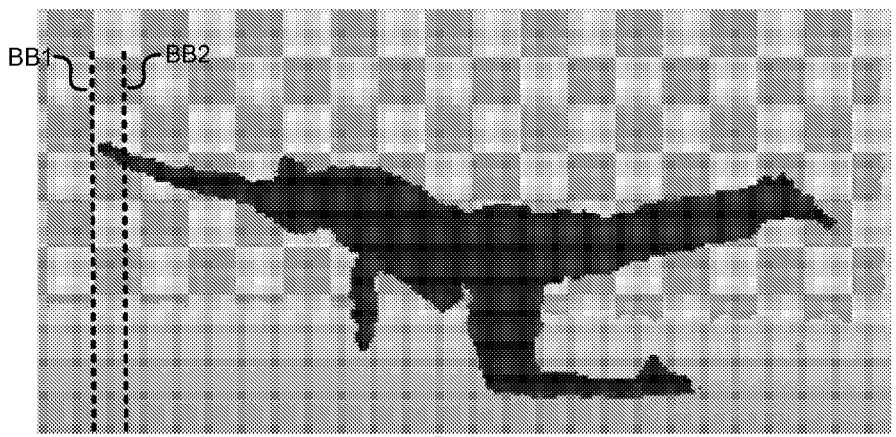
Figure 11E:
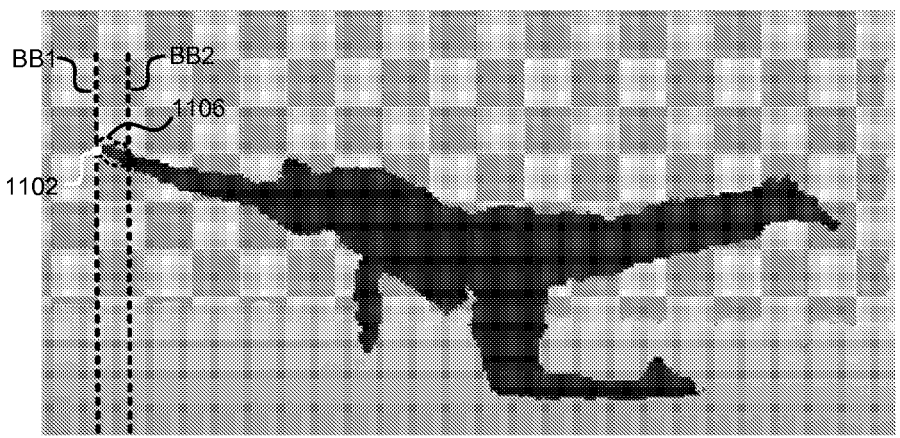
Figure 11F:
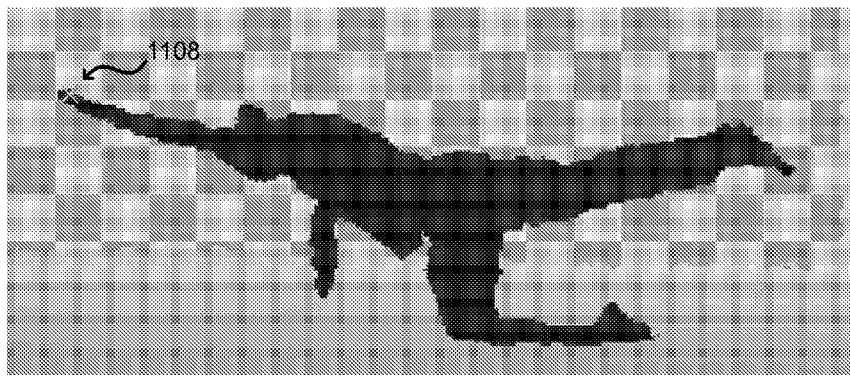
Figure 12:
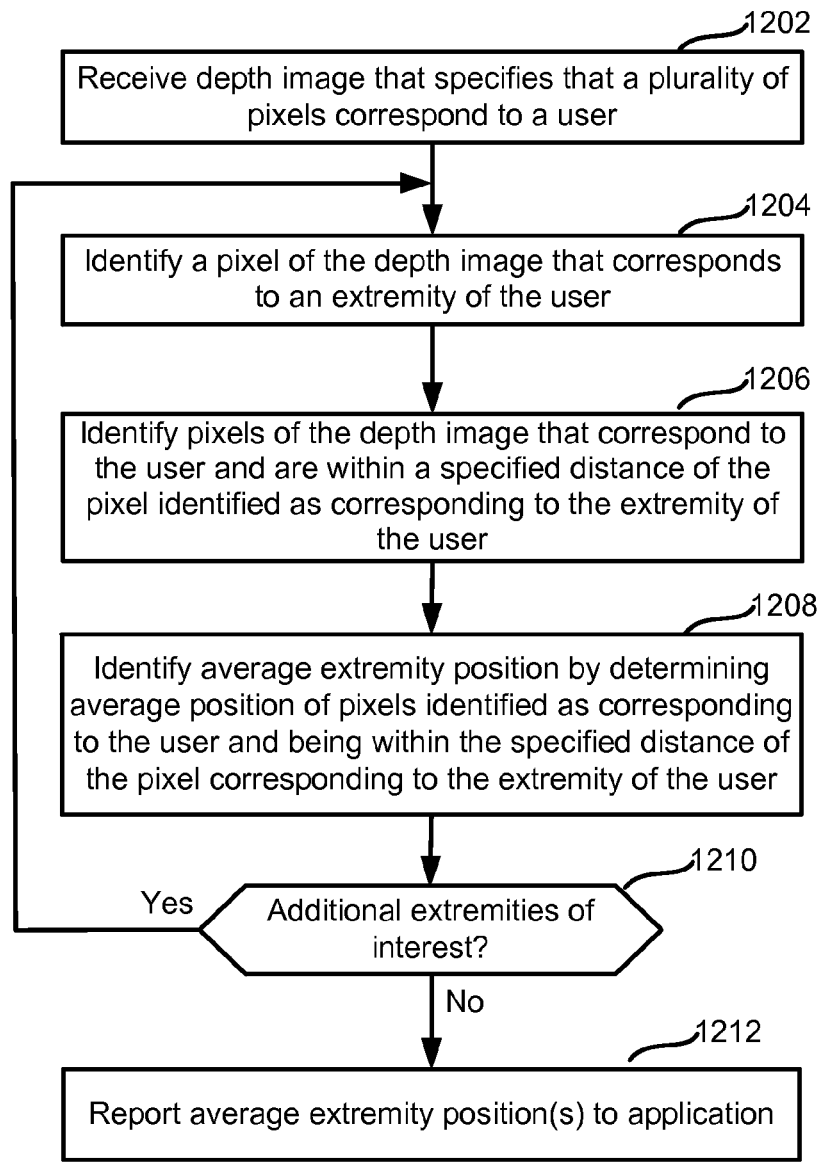
FIG. 12 illustrates a high level flow diagram that is used to summarize methods for identifying average extremity positions of a user based on a depth image.

The high level flow diagram of FIG. 12 will now be used to describe a method for determining average positions of extremity blobs. Referring to FIG. 12, at step 1202, a depth image is received, wherein the depth image specifies that a plurality of pixels correspond to a user. Since step 1202 is essentially the same as step 702 described above with reference to FIG. 7, additional details of step 702 can be understood from the above discussion of step 702. At step 1204, a pixel of the depth image that corresponds to an extremity of the user is identified. Depending upon which extremity is being considered, step 1204 can involve identifying the pixel of the depth image that corresponds to either the leftmost, rightmost, topmost or bottommost pixel of the user. Examples of such pixels were described above with reference to FIG. 11. As will be describe in more detail below, step 1204 may alternatively involve identifying the pixel of the depth image that corresponds to the frontmost pixel of the depth image that corresponds to the user. At step 1206, there is an identification of pixels of the depth image that correspond to the user and are within a specified distance (e.g., within 5 pixels in a specified direction) of the pixel identified at step 1204 as corresponding to the extremity of the user. At step 1208, an average extremity position, which can also be referred to as the average position of an extremity blob, is determined by determining an average position of the pixels that were identified at step 1206 as corresponding to the user and being within the specified distance of the pixel corresponding to the extremity of the user. At step 1210 there is a determination of whether there are any additional extremities of interest for which an average extremity position (i.e., an average position of an extremity blob) is/are to be determined. The specific extremities of interest can be dependent on the application that is going to use the average extremity position(s). For example, wherein only the left and right extremities are of interest, steps 1204-1208 can be performed for each of these two extremities are of interest. As indicated at step 1212, one or more average extremity positions (e.g., the average positions of the left and right extremity blobs) are reported to an application, thereby enabling the application to be updated based on such positional information.

Figure 13:
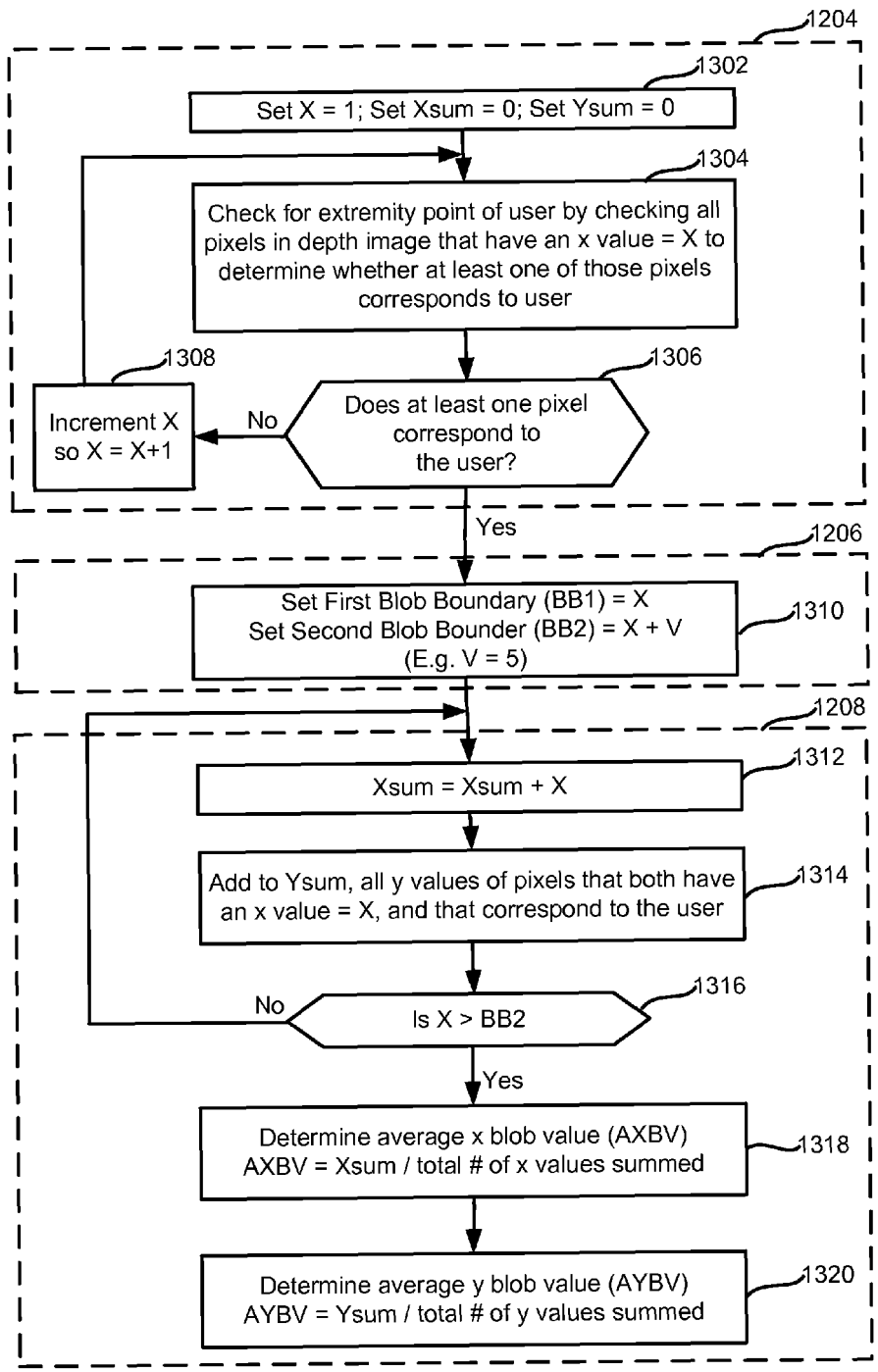
FIG. 13 is a high level flow diagram that is used to provide additional details of some of the steps in FIG. 12, according to an embodiment.

FIG. 13, together with FIGS. 11A-11F, will now be used to provide additional details of steps 1204-1208 of FIG. 12, according to an embodiment. For this discussion, it will be assumed that the initial extremity of interest is the left extremity. Referring to FIG. 13, steps 1302-1308 provide additional details regarding how to identify, at step 1204, a pixel (of the depth image) that corresponds to the leftmost point of the user, in accordance with an embodiment. At step 1302, various values are initialized, which involves setting X=1, setting Xsum=0, and setting Ysum=0. At step 1304, the leftmost extremity point of the user is searched for by checking all pixels in the depth image that have an x value=X to determine if at least one of those pixels corresponds to the user. Such determinations can be based on segmentations values corresponding to the pixels. Referring briefly to FIG. 11B, this can involve checking all of the pixels of the depth image along the dashed line 1140 to determine if at least one of those pixels corresponds to the user. Returning to FIG. 13, at step 1306 there is a determination of whether at least one of the pixels checked at step 1304 corresponded to the user. If the answer to step 1306 is no, then X is increment at step 1308, and thus, X now equals 2. Steps 1304 and 1306 are then repeated to determinate whether any of the pixels of the depth image, that have an x value=2, correspond to the user. In other words, referring back to FIG. 11B, the dashed line 1140 would be moved to the right by one pixel, and all of the pixels of the depth image along the moved over line 1140 are checked to determine if at least one of those pixels corresponds to the user. Steps 1304-1308 are repeated until a pixel corresponding to the user is identified, wherein the identified pixel will correspond to the leftmost extremity of the user, which is the point 1102a shown in FIG. 11A. Referring to FIG. 11C, the dashed line 1140 therein shows that point at which the leftmost extremity of the user is identified.

Step 1310 in FIG. 13 provides additional details of an embodiment for identifying, at step 1206, pixels of the depth image that correspond the user and are within a specified distance (e.g., within 5 pixels in the x direction) of the pixel identified as corresponding to the leftmost extremity of the user. Additionally, steps 1312-1320 in FIG. 13 will be used to provide additional detail regarding an embodiment for identifying, at step 1208, the average left extremity position. At step 1310, blob boundaries are specified, which involves setting a first blob boundary (BB1)=X, and setting a second blob boundary (BB2)=X+V, where V is a specified integer. For the following example it will be assumed that V=5, however V can alternatively be smaller or larger than 5. The pixels of the depth image that correspond to the user and between BB1 and BB2 (inclusive of BB1 and BB2) are an example of pixels of the depth image that correspond to the user and are within a specified distance of the pixel identified as corresponding to the extremity of the user. In FIG. 11D the two dashed vertical lines labeled BB1 and BB2 are examples of the first and second blob boundaries. The pixels which are encircled by the dashed line 1106 in FIG. 11E are pixels of the depth image that are identified as corresponding to the user and being within the specified distance (e.g., within 5 pixels in the x direction) of the pixel 1102 that corresponds to the leftmost extremity of the user. Such pixels, encircled by the dashed line 1106, can also be referred to as the left extremity blob, or more generally, as a side blob.

At step 1312, Xsum is updated so that Xsum=Xsum+X. At step 1314 Ysum is updated by adding to Ysum all of the y values of pixels of the depth image that correspond to the user and have an x value=X. At step 1316, there is a determination of whether X is greater than the second blob boundary BB2. As long as the answer to step 1316 is no, steps 1312 and 1314 are repeated, each time updating the values for Xsum and Ysum. At step 1318, an average X blob value (AXBV) is determined as being equal to the Xsum divided by the total number of x values that were summed. At step 1320, an average Y blob value (AYBV) is determined as being equal to the Ysum divided by the total number of y values that were summed. In this embodiment, AXBV and AYBV collectively provide the average x, y position of the left extremity, which can also be referred to as the average position of the left extremity blob. The "X" labeled 1108 in FIG. 11F is an example of an identified average position of a side blob.

Similar steps to those described above with reference to FIG. 13 can be performed to determine an average position of a right extremity blob. However, for this determination X would be set to its maximum value at step 1302, X would be decremented by 1 at step 1308, the second blob boundary (BB2) specified at step 1310 would be equal to X−V, and at step 1316 there would be a determination of whether X<BB2.

Similar steps to those described above with reference to FIG. 13 can be performed to determine an average position of a top or upper extremity blob. However, for this determination: Y would be set to 0 at step 1302; Y would be incremented at step 1308; at step 1310 BB1 would be specified to be equal to Y and BB2 would be specified to be equal to Y+V; at step 1312 Xsum would be updated by adding to Xsum all of the x values of pixels of the depth image that correspond to the user and have a y value=Y; and at step 1314 Ysum would be updated by adding Y to Ysum.

Similar steps to those described above with reference to FIG. 13 can be performed to determine an average position of a bottom extremity blob. However, for this determination: Y would be set to its maximum value at step 1302; Y would be decremented by 1 at step 1308; at step 1310 BB1 would be specified to be equal to Y and BB2 would be specified to be equal to Y−V; at step 1312 Xsum would be updated by adding to Xsum all of the x values of pixels of the depth image that correspond to the user and have a y value=Y; and at step 1314 Ysum would be updated by adding Y to Ysum. The terms left and right are relative terms, which are dependent upon whether positions are viewed from the perspective of the user represented within the depth image, or viewed from the perspective of the capture device that was used to capture the depth image. Accordingly, the term side can more generally be used to refer to left or right extremities or blobs.

Figure 14:
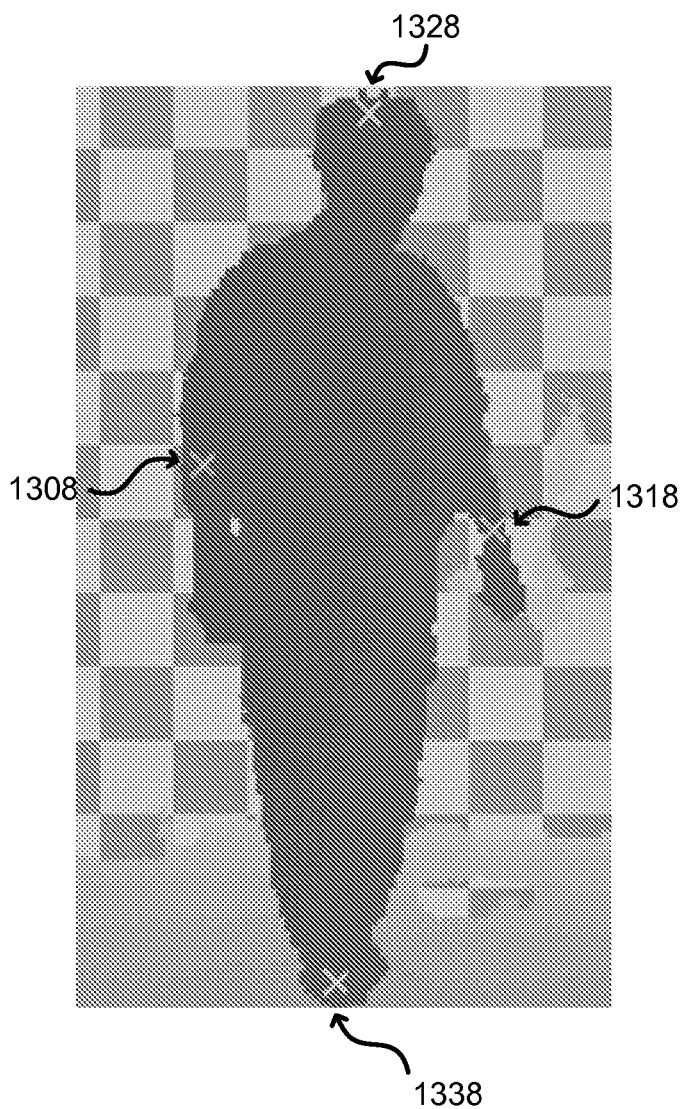
FIG. 14 shows a silhouette representing a plurality of pixels corresponding to a user (of a depth image) in a standing position along with average extremity positions determined based on the depth image.
Figure 15:
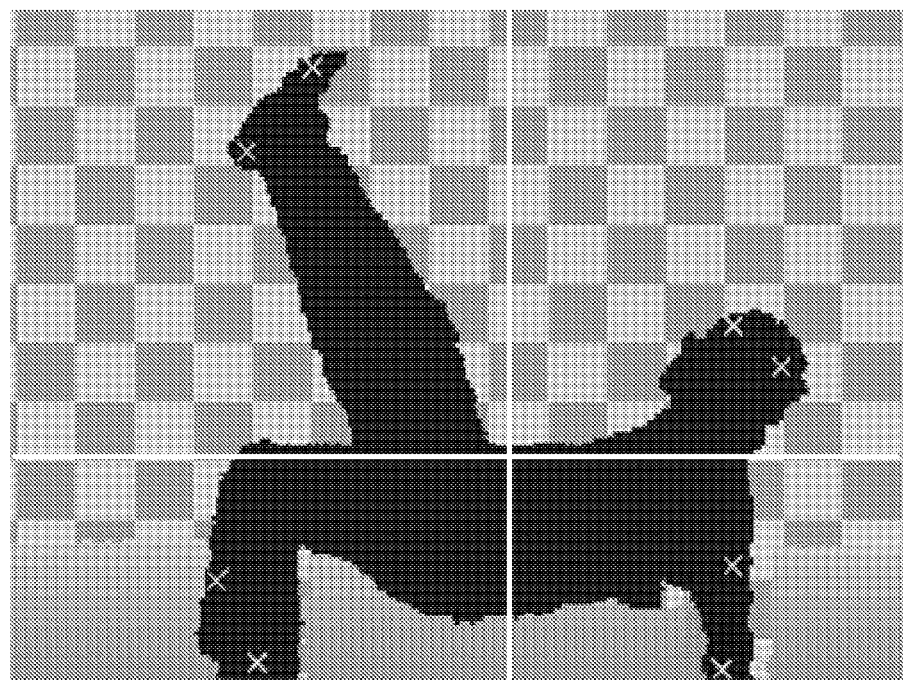
FIG. 15 is used to explain that a user within a depth image can be divided into quadrants, and average extremity positions can be determined for each quadrant.

Referring to FIG. 14, the dark silhouette shown therein represents a plurality of pixels (of a depth image) corresponding to a user in a standing position with one of their feet in positioned in front of the other. The four "X"s shown in FIG. 14 indicate various average positions of blobs that can be identified using embodiments described herein. More specifically, the "X" labeled 1308 corresponds an average position of a first side blob, which can also be referred to as an average side extremity position. The "X" labeled 1318 corresponds an average position of a second side blob, which can also be referred to as an average side extremity position. The "X" labeled 1328 corresponds an average position of a top blob, which can also be referred to as an average top or upper extremity position. The "X" labeled 1338 corresponds to an average position of a bottom blob, which can also be referred to as an average bottom or lower extremity position.

In accordance with certain embodiments, the pixels (of a depth image) that correspond to a user can be divided into quadrants, and average positions of one or more extremity blobs can be determined for each quadrant, in a similar manner as was discussed above. Such embodiments can be appreciated from FIG. 15, where the horizontal and vertical while lines divide the pixels corresponding to the user into quadrants, and the "X"s correspond to average positions of various extremity blobs.

Figure 16:
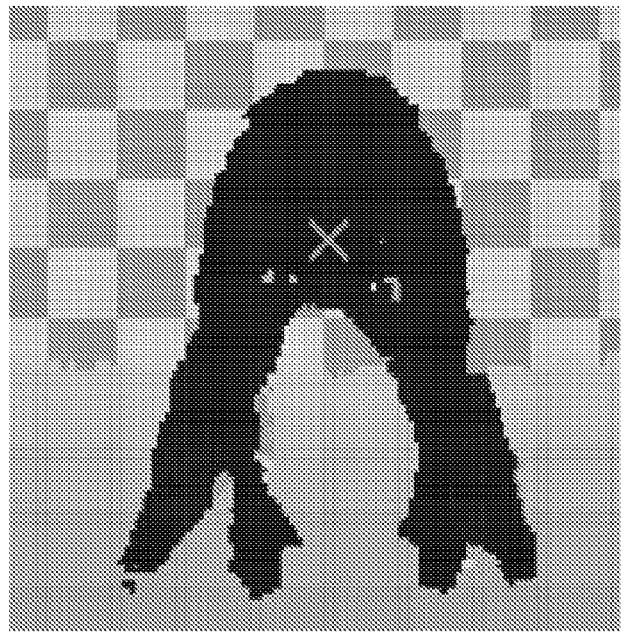
FIG. 16, which shows a silhouette representing a plurality of pixels corresponding to a user (of a depth image) bending forward, is used to explain how an average front extremity position can be determined based on the depth image.

As can be seen in FIG. 16, embodiments described herein can also be used to determine an average position of a front blob, which is indicated by the "X" in FIG. 16. In this FIG., the front blob corresponds to a portion of a user bending over with their head being the closes portion of their body to the capture device. When identifying an average position of a front blob, z values of pixels of the depth image are used in place of either x or y values when, for example, performing the steps described with reference to FIG. 13. In other words, planes defined by the z- and x-axes, or the z- and y-axes, are searched through for a z extremity, as opposed to searching through planes defined by x- and y-axes.

The camera (e.g., 226) that is used to obtain depth images may be tilted relative to the floor upon which a user is standing or otherwise supporting themselves. In accordance with specific embodiments, camera tilt is accounted for (also referred to as corrected for) before determining average positions of extremity blobs. Such correction for camera tilt is most beneficial when determining an average position for a front blob, because such a position is dependent on z values of pixels of the depth image. To account for such camera tilt, a gravity vector can be obtained from a sensor (e.g., an accelerometer) or in some other manner, and factored in. For example, such accounting for camera tilt (also referred to as tilt correction) can be performed on pixels that correspond to a user, before such pixels are used to identify an average position of a front blob. In certain embodiments, the tilt correction is performed by selecting a search axis (which can also be referred to as a normalized search direction), and projecting all pixels to the search axis. This can be done via dotting each pixel's position with the normalized search direction. This yields a distance along the search direction that can used to search for a pixel corresponding to a frontmost extremity, by finding the pixel with the greatest z value. The greatest z value, and the greatest z value−V, can be used to identify the blob boundaries BB1 and BB2, and thus a region within to sum pixel values to determine an average.

Where more than one user is represented in a depth image, a separate instance of the method of FIG. 12 can be performed for each user. For example, assume that a first group of pixels in a depth image correspond to a first user, and a second group of pixels in the same depth image correspond to a second user. This would result in average positions of extremity blobs being identified for each user.

The method described above with reference to FIG. 12 can be repeated for additional depth images, thereby resulting in average positions of extremity blobs being determined for each of a plurality of depth images. This enables changes in average extremity positions to be tracked. Where more than one user is represented in a depth image, each time the method is repeated, average positions of extremity blobs can be identified for each user.

Referring back to FIG. 2A, the depth image processing and object reporting module 244 can report its determination to the application 246. Such reporting was also discussed above with reference to step 1212 in FIG. 12. More specifically, as shown in FIG. 12, information indicative of identified average extremity position(s) can be reported to the application.

Figure 17:
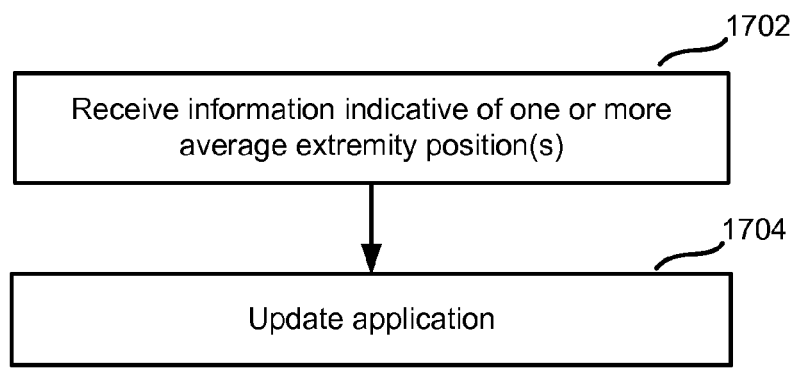
FIG. 17 illustrates a high level flow diagram that is used to summarize how an application can be updated based on information determined in accordance with embodiments described with reference to FIGS. 11A-16.

Referring now to FIG. 17, at step 1702 the application receives information indicative of identified average extremity position(s). As shown at step 1704, the application is updated based on such information. For example, as mentioned above, such information can be used to track a user performing certain exercises and/or poses so that an avatar of the user can be controlled, points can be awarded to the user and/or feedback can be provided to the user. For a more specific example, where the application 246 is a game that instructs a user to perform certain exercises and/or poses, the application 246 can determine whether a user has performed an exercise or pose with correct form, and where they have not, can provide feedback to the user regarding how the user can improve their form.

An advantage of identifying average positions of extremity blobs, based entirely on a depth image, is that information indicative of extremities of a user's body can be determined even when ST techniques fail. Another advantage is that information indicative of extremities of a user's body can determined once a depth image is available in a processing pipeline, thereby reducing latency, as ST techniques do not need to be executed. Nevertheless information indicative of extremities of a user's body can also be determined using ST techniques, if desired.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method for using a depth image to extract user behavior, comprising:
   receiving a depth image that specifies that a plurality of pixels correspond to a user;
   fitting a curve to a portion of the plurality of pixels corresponding to the user to thereby produce a fitted curve comprising a plurality of straight line segments;
   identifying a first straight line extending between endpoints of the fitted curve;
   identifying a second straight line extending orthogonally from the first straight line to a point of the fitted curve that is farthest away from the first straight line; and
   determining, based on the first and second straight lines, information indicative of a curvature of the user's body.

2. The method of claim 1, wherein:
   the depth image is obtained using a capture device located a distance from the user;
   the depth image also specifies, for each of the pixels corresponding to the user, a pixel location and a pixel depth; and
   the pixel depth, specified for each of the pixels corresponding to the user, is indicative of a distance between the capture device and a portion of the user represented by the pixel.

3. The method of claim 1, further comprising:
   using the determined information indicative of a curvature of the user's body to update an application.

4. The method of claim 1, wherein the fitting a curve to a portion of the plurality of pixels corresponding to the user comprises:
   fitting a curve to a subset of pixels corresponding to an upper peripheral portion, relative to a plane, of the plurality of pixels corresponding to the user.

5. The method of claim 1, further comprising:
   determining information indicative of an angle of the user's body by determining an angle, relative to a plane, of the first straight line extending between endpoints of the fitted curve;
   wherein the determined angle is indicative of an angle of the user's body.

6. The method of claim 1, further comprising:
   determining an angle, relative to the first straight line extending between endpoints of the fitted curve, of one of the straight line segments of the fitted curve;
   wherein the determined angle comprises further information indicative of a curvature of the user's body.

7. The method of claim 1, wherein the determining information indicative of a curvature of the user's body comprises:
   determining a length of the first straight line extending between endpoints of the fitted curve;
   determining a length of the second straight line extending orthogonally from the first straight line to a point of the fitted curve that is farthest away from the first straight line; and
   determining a ratio of the length of the first line to the length of the second line;
   wherein the ratio is indicative of the curvature of the user's body.

8. The method of claim 7, wherein:
   the plurality of straight line segments of the fitted curve consists of three straight line segments;
   the endpoints of the fitted curve comprise a first endpoint and a second endpoint;
   a first one of the three straight line segments extends between the first endpoint of the fitted curve and a first midpoint of the fitted curve;
   a second one of the three straight line segments extends between the first midpoint of the fitted curve and a second midpoint of the fitted curve; and
   a third one of the three straight line segments extends between the second midpoint of the fitted curve and the second endpoint of the fitted curve.

9. The method of claim 8, wherein determining a length of the second straight line extending orthogonally from the first straight line to a point of the fitted curve that is farthest away from the first straight line comprises:
   determining a first length of a line extending orthogonally from the first straight line to the first midpoint of the fitted curve;

determining a second length of a line extending orthogonally from the first straight line to the second midpoint of the fitted curve; and determining which one of the first length and the second length is longer;

wherein the longer one of the first length and the second length is used, when determining the ratio indicative of the curvature of the user's body, as the length of the second straight line extending orthogonally from the first straight line to the point of the fitted curve that is farthest away from the first straight line.

10. The method of claim 7, further comprising:
using the ratio, which is indicative of the curvature of the user's body, to update an application.

11. A system that uses depth images to extract user behavior, comprising:
a capture device that obtains depth images;
a communication interface that receives depth images from the capture device;
one or more storage devices that store depth images;
a display interface; and
one or more processors in communication with the one or more storage devices and the display interface, wherein the one or more processors are configured to identify, for each of a plurality of depth images
a pixel of the depth image that corresponds to an extremity of a user;
pixels of the depth image that correspond to the user and are within a specified distance of the pixel identified as corresponding to the extremity of the user; and
an average extremity position by determining an average position of the pixels identified as corresponding to the user and being within the specified distance of the pixel corresponding to the extremity of the user.

12. The system of claim 11, wherein the average extremity position corresponds to one of a first side, a second side, a top, a bottom or a front of the user.

13. The system of claim 11, wherein the one or more processors use the average extremity position to update an application running on the system and provide signals on the display interface that indicate an update to the application.

14. The system of claim 11, wherein, for each of a plurality of depth images, the one or more processors are also configured to:
divide the pixels corresponding to the user into quadrants;
identify one or more average extremity positions for at least two of the quadrants; and
use one or more of the identified average extremity positions identified from one or more of the quadrants to update an application running on the system and provide signals on the display interface that indicate an update to the application.

15. One or more processor readable storage devices having instructions encoded thereon which when executed cause one or more processors to perform a method for using depth images to extract user behavior, the method comprising:
receiving a depth image that specifies that a plurality of pixels correspond to a user;
identifying a pixel of the depth image that corresponds to an extremity of the user;

identifying pixels of the depth image that correspond to the user and are within a specified distance of the pixel identified as corresponding to the extremity of the user; and identifying an average extremity position by determining an average position of the pixels identified as corresponding to the user and being within the specified distance of the pixel corresponding to the extremity of the user.

16. The one or more processor readable storage devices of claim 15, wherein the method further comprises:
identifying a pixel of the depth image that corresponds to a second extremity of the user;
identifying pixels of the depth image that correspond to the user and are within a specified distance of the pixel identified as corresponding to the second extremity of the user; and
identifying an average second extremity position by determining an average position of the pixels identified as corresponding to the user and being within the specified distance of the pixel corresponding to the second extremity of the user.

17. The one or more processor readable storage devices of claim 16, wherein the method further comprises:
using the average extremity position and the second average extremity position to update an application.

18. The one or more processor readable storage devices of claim 15, wherein:
the identifying a pixel of the depth image that corresponds to an extremity of the user comprises identifying a pixel of the depth image that corresponds to one of a leftmost, rightmost, topmost, bottommost or frontmost extremity of the user;
the identifying pixels of the depth image that correspond to the user and are within a specified distance of the pixel identified as corresponding to the extremity of the user comprises identifying pixels of the depth image that correspond to the user and are within the specified distance of the one of the leftmost, rightmost, topmost, bottommost or frontmost extremity of the user; and
the identifying an average extremity position comprises determining an average position of the pixels identified as corresponding to the user and being within the specified distance of the pixel corresponding to the one of the leftmost, rightmost, topmost, bottommost or frontmost extremity of the user.

19. The one or more processor readable storage devices of claim 15, wherein the method further comprises:
dividing the pixels corresponding to the user into quadrants;
identifying one or more average extremity positions for at least two of the quadrants; and
using at least one of the identified average extremity positions determined for one or more of the quadrants to update an application.

20. The one or more processor readable storage device of claim 15, wherein the average extremity position corresponds to one of a first side, a second side, a top, a bottom or a front of the user.

* * * * *